(12) United States Patent
Jung et al.

(10) Patent No.: US 10,390,380 B2
(45) Date of Patent: Aug. 20, 2019

(54) ELECTRONIC DEVICE, SYSTEM, AND METHOD FOR CONNECTING SHORT-RANGE COMMUNICATION

(71) Applicant: Samsung Electronics Co., Ltd., Gyeonggi-do (KR)

(72) Inventors: Bu-Seop Jung, Gyeonggi-do (KR); Hye-Jung Bang, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/713,939

(22) Filed: Sep. 25, 2017

(65) Prior Publication Data

US 2018/0124846 A1 May 3, 2018

(30) Foreign Application Priority Data

Nov. 2, 2016 (KR) .................. 10-2016-0145183

(51) Int. Cl.
| | |
|---|---|
| *H04W 4/80* | (2018.01) |
| *H04W 76/14* | (2018.01) |
| *H04W 8/00* | (2009.01) |
| *H04W 8/18* | (2009.01) |
| *H04W 8/22* | (2009.01) |
| *H04W 40/24* | (2009.01) |

(Continued)

(52) U.S. Cl.
CPC ............ *H04W 76/14* (2018.02); *H04W 4/80* (2018.02); *H04W 8/005* (2013.01); *H04W 8/18* (2013.01); *H04W 8/22* (2013.01); *H04W 40/24* (2013.01); *H04W 84/12* (2013.01); *H04W 88/005* (2013.01); *H04W 8/186* (2013.01); *H04W 84/20* (2013.01); *H04W 88/02* (2013.01)

(58) Field of Classification Search
CPC combination set(s) only.
See application file for complete search history.

(56) References Cited

U.S. PATENT DOCUMENTS

| | | | |
|---|---|---|---|
| 2005/0107102 A1* | 5/2005 | Yoon | ..................... H04W 74/00 455/466 |
| 2013/0036231 A1 | 2/2013 | Suumaki | |

(Continued)

FOREIGN PATENT DOCUMENTS

| | | |
|---|---|---|
| EP | 3 038 407 A1 | 6/2016 |
| KR | 1020150014215 A | 2/2015 |

OTHER PUBLICATIONS

International Search Report dated Jan. 8, 2018.
European Search Report dated Jul. 15, 2019.

*Primary Examiner* — Cindy Trandai
(74) *Attorney, Agent, or Firm* — Cha & Reiter, LLC

(57) ABSTRACT

Disclosed is an electronic device which includes: a display; a communication circuit; a processor electrically connected to the display and the communication circuit; and a memory electrically connected to the processor, wherein the memory stores instructions, when executed by the processor, causes the processor to receive a short-range communication connection request from a first electronic device through the communication circuit and transmit, to the first electronic device, a signal including information for inducing a connection to a second electronic device, which is a group owner to which the electronic device is in Wi-Fi P2P direct communication with.

16 Claims, 16 Drawing Sheets

(51) Int. Cl.
   *H04W 84/12*   (2009.01)
   *H04W 88/00*   (2009.01)
   *H04W 88/02*   (2009.01)
   *H04W 84/20*   (2009.01)

(56) References Cited

U.S. PATENT DOCUMENTS

| | | | |
|---|---|---|---|
| 2013/0039358 A1* | 2/2013 | Ejima | H04W 84/20 370/338 |
| 2013/0148162 A1* | 6/2013 | Park | G06F 3/1296 358/1.15 |
| 2013/0194962 A1 | 8/2013 | Abraham et al. | |
| 2013/0217324 A1* | 8/2013 | Lee | H04M 1/7253 455/41.1 |
| 2013/0227152 A1* | 8/2013 | Lee | H04W 48/16 709/227 |
| 2013/0336161 A1* | 12/2013 | Jung | H04W 76/14 370/254 |
| 2014/0056209 A1 | 2/2014 | Park et al. | |
| 2014/0094211 A1* | 4/2014 | Ren | H04W 84/20 455/517 |
| 2014/0314065 A1* | 10/2014 | Song | H04W 8/005 370/338 |
| 2014/0357269 A1* | 12/2014 | Zhou | H04W 76/14 455/434 |
| 2015/0043484 A1* | 2/2015 | Jung | H04W 76/14 370/329 |
| 2015/0117318 A1* | 4/2015 | Qi | H04W 76/18 370/329 |
| 2015/0133049 A1* | 5/2015 | Lee | H04W 4/60 455/41.1 |
| 2015/0223046 A1* | 8/2015 | Patil | H04W 8/005 370/254 |
| 2015/0245393 A1* | 8/2015 | Lee | H04W 8/005 370/338 |
| 2015/0281915 A1 | 10/2015 | Yoon | |
| 2015/0341853 A1 | 11/2015 | Cho et al. | |
| 2016/0087967 A1 | 3/2016 | Pang et al. | |
| 2016/0165411 A1* | 6/2016 | Lee | H04W 76/14 455/426.1 |
| 2016/0191249 A1 | 6/2016 | Panchapakesan et al. | |
| 2016/0191503 A1 | 6/2016 | Panchapakesan et al. | |
| 2016/0212679 A1 | 7/2016 | Wang | |
| 2016/0373914 A1* | 12/2016 | Lee | H04W 8/005 |
| 2017/0055203 A1* | 2/2017 | Lee | H04W 92/18 |
| 2017/0094481 A1* | 3/2017 | Lin | H04N 21/26258 |
| 2017/0156172 A1* | 6/2017 | Yokoyama | H04W 68/12 |
| 2017/0265238 A1* | 9/2017 | Li | H04W 48/16 |
| 2017/0332210 A1* | 11/2017 | Iwami | H04W 76/10 |
| 2018/0048701 A1* | 2/2018 | Iwami | H04W 8/00 |
| 2018/0069761 A1* | 3/2018 | Iwami | G06F 13/00 |

* cited by examiner

| Field Name | Size (octets) | Value | Description |
| --- | --- | --- | --- |
| Length | 1 | variable | Length of the following fields. |
| P2P Device address | 6 | — | An identifier used to uniquely reference a P2P Device. |
| P2P Interface address | 6 | — | An address used to identify a P2P Device within a P2P Group. |
| Device Capability Bitmap | 1 | variable | A set of parameters indicating P2P Device's capabilities, as defined in Table 12. |
| Config Methods | 2 | As defined in [2] | The WSC Methods that are supported by this device e.g. PIN from a Keypad, PBC etc. Contains only the Data part of the WSC Config Methods attribute (see [2]).<br><br>Note — Byte ordering within the Config Methods field shall be big-endian. |
| Primary Device Type | 8 | As defined in Appendix B | Primary Device Type of the P2P Client (see Appendix B). Contains only the Data part of the WSC Primary Device Type attribute (excludes the Attribute ID and Length fields).<br><br>Note — Byte ordering within the Primary Device Type field shall be big-endian. |
| Number of Secondary Device Types | 1 | variable | Indicating number of Secondary Device Types in the Secondary Device Type List field. This field set to 0 indicates no Secondary Device Type List. |
| Secondary Device Type List | variable | 8*n | List of Secondary Device Types of the P2P Client (see [2]). This field is optional. This field is present only if the Number of Secondary Device Types field is not 0 and contains only the Data part of the WSC Secondary Device Type List attribute (excludes the Attribute ID and Length fields).<br><br>Note — Byte ordering within the Secondary Device Type List field shall be big-endian. |
| Device Name | variable | As defined in [2] | Friendly name of the P2P Client. Contains the entire WSC Device Name attribute in TLV format (see [2]).<br><br>Note — Byte ordering within the Device Name field shall be big-endian. |

FIG.5

ELECTRONIC DEVICE, SYSTEM, AND METHOD FOR CONNECTING SHORT-RANGE COMMUNICATION

CLAIM OF PRIORITY

This application claims priority under 35 U.S.C. § 119(a) to Korean Application Serial No. 10-2016-0145183, which was filed in the Korean Intellectual Property Office on Nov. 2, 2016, the entire content of which is hereby incorporated by reference.

TECHNICAL FIELD

The present disclosure relates to an electronic device, a system, and a method for providing a connectivity in short-range communication networks.

BACKGROUND

Wi-Fi P2P (Wi-Fi Peer to Peer or Wi-Fi Direct) is a Wi-Fi standard enabling devices to easily connect with each other without requiring a wireless access point. Wi-FI technology allows devices to establish a direct Wi-FI connection using the existing Wi-Fi interface without an access point serving as a network working hardware device.

Wi-Fi electronic devices having a wireless connection therebetween using Wi-Fi P2P are referred to as a P2P group. Based on assumption of a 1:1 connection, one electronic device operates as a group owner and the remaining electronic devices operate as group clients.

SUMMARY

In a state where a Wi-Fi P2P group is formed, when a new electronic device makes a request to connect to an electronic device corresponding to an owner of the group, the connection may be made normally. However, when the new electronic device makes a request to connect to an electronic device corresponding to a client of the group, the connection may not be made and require additional authentication process which cause a delay.

Thus, there is a need to overcome the above-described problems, and provides additional advantages, by providing a method, system and apparatus for processing a connection request that can be processed by an electronic device of a group client for a short-range communication connection.

Various embodiments of the present disclosure may provide an electronic device, a system, and a method for providing a short-range communication connection between electronic devices where a new device makes a request for connectivity to another device that is a group client, so that the new device can be connected to other device that is a group owner in much efficient way.

In accordance with an aspect of the present disclosure, an electronic device includes: a display; a communication circuit; a processor electrically connected to the display and the communication circuit; and a memory electrically connected to the processor, wherein the memory stores instructions that, when executed by the processor, causes the processor to: receive a short-range communication connection request from a first electronic device through the communication circuit and transmit, to the first electronic device, a signal including information for inducing a connection to a second electronic device, which is a group owner in relation to the electronic device in communication therewith.

In accordance with another aspect of the present disclosure, a system for a short-range communication connection includes: a first electronic device, a second electronic device defined as a group client, and a third electronic device defined as a group owner in communication with the second electronic device, wherein the first electronic device transmits a short-range communication connection to the second electronic device, receives a signal including information for inducing a connection to a third electronic device from the second electronic device, and transmits a request for the connection to the third electronic device, e wherein the second electronic device, when receiving the short-range communication connection request from the first electronic device, transmits, to the first electronic device, the signal including the information for inducing the connection to the third electronic device; and wherein the third electronic device, when receiving the signal including the information for inducing the from the first electronic device, establishes the short-range communication connection with the first electronic device.

In accordance with another aspect of the present disclosure, an electronic device includes: a display; a communication circuit; a processor electrically connected to the display and the communication circuit; and a memory electrically connected to the processor, wherein the memory stores instructions that, when executed by the processor, causes the processor to: receive connection information indicating a connection with a first electronic device defined as a group owner, from at least one of electronic devices found by a search for a short-range communication connection through the communication circuit, and when a request for a connection to a second electronic device defined as a group client among the found electronic devices, is made, transmit a request for the short-range communication connection to the first electronic device in communication with the second electronic device based on the received connection information.

In accordance with another aspect of the present disclosure, a method of a short-range communication connection by an electronic device includes: receiving a short-range communication connection request from a first electronic device; and based on the short-range communication connection request, transmitting, to the first electronic device, a signal including information for inducing a connection to a second electronic device, the second electronic device being a group owner to which the electronic device is in communication with.

In accordance with another aspect of the present disclosure, a method of a short-range communication connection includes: trasnmitting, by a first electronic device, a request for a short-range communication to a second electronic device in communication with a third electronic device, the second electronic device being a group client and the third electronic device being a group owner, in response to the short-range communication connection request, receiving, by the first electronic device, a signal including information for inducing a connection to the third electronic device from the second electronic device, and transmitting, by the first electronic device, a request for the connection to the third electronic device; and upon receiving the signal including the information for inducing the connection to the third electronic device, establishing, by the third electronic device, a short-range communication connection with the first electronic device.

In accordance with another aspect of the present disclosure, a method of a short-range communication connection by an electronic device includes: receiving connection information indicating a connection with a first electronic device defined as a group owner, from at least one of electronic devices found by a search for a short-range communication connection; and when a request for a connection to a second electronic device defined as a group client among the found electronic devices is made, transmitting a request for the short-range communication connection to the first electronic device in communication with the second electronic device, based on the received connection information.

An electronic device, a system, and a method for a short-range communication connection according to various embodiments can provide consistent connection usability of the user and significantly improve the connection speed and usability. Further, it is possible to maintain compatibility with the existing connection scheme by controlling a connection algorithm changed within a range of the Wi-Fi Direct standard.

BRIEF DESCRIPTION OF THE DRAWINGS

The above and other aspects, features, and advantages of the present disclosure will be more apparent from the following detailed description taken in conjunction with the accompanying drawings, in which:

FIG. 5 illustrates a client information descriptor according to various embodiments of the present disclosure;

DETAILED DESCRIPTION

Figure 1:
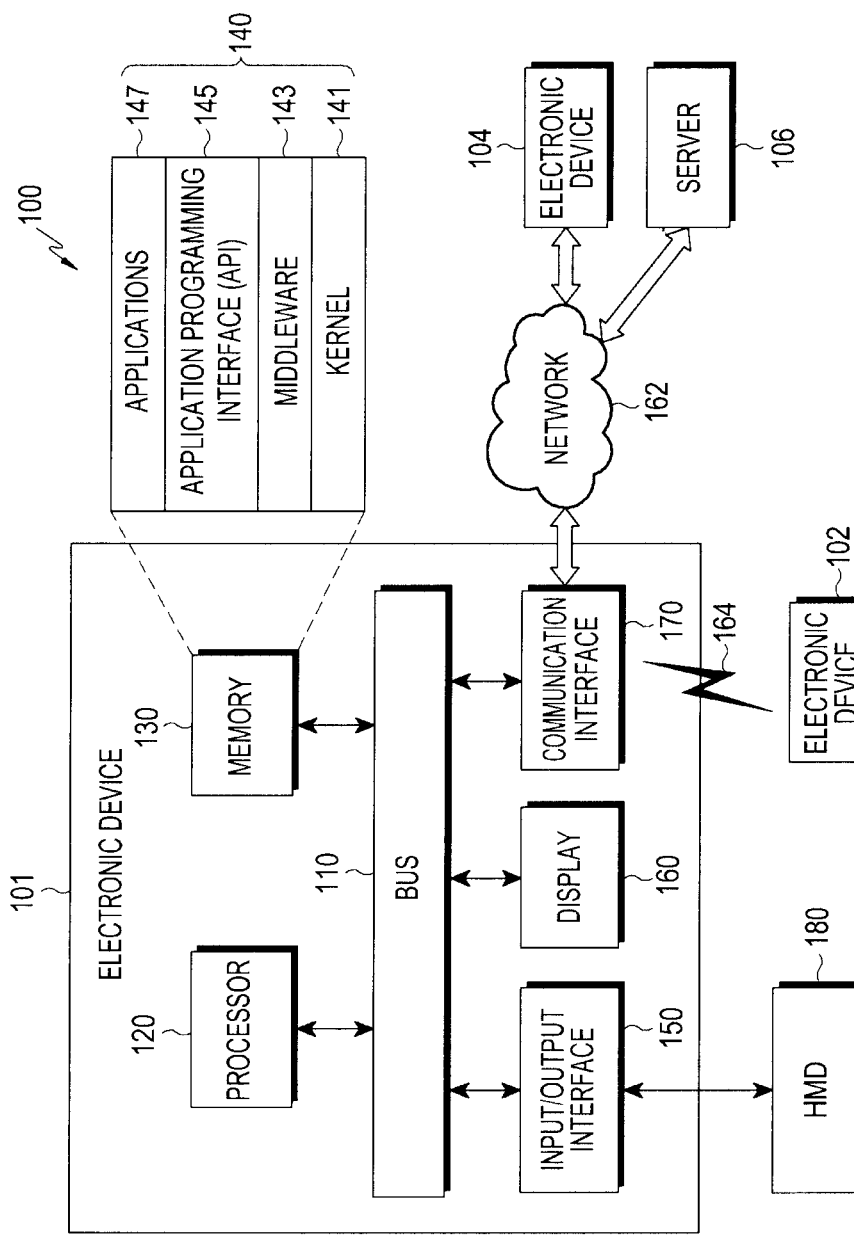
FIG. 1 illustrates a network environment according to various embodiments.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

Referring to FIG. 1, an electronic device 101 within a network environment 100 will be described according to various embodiments. The electronic device 101 may include a bus 110, a processor 120, a memory 130, an input/output interface 150, a display 160, a communication interface 170, and a head-mounted device 180. In some embodiments, the electronic device 101 may omit at least one of the elements, or may further include other elements.

The bus 110 may include, for example, a circuit that interconnects the components 110 to 170 and delivers communication (for example, a control message and/or data) between the components 110 to 170.

The processor 120 may include one or more of a Central Processing Unit (CPU), an Application Processor (AP), and a Communication Processor (CP). The processor 120, for example, may carry out operations or data processing relating to the control and/or communication of at least one other element of the electronic device 101. The memory 130 may include a volatile and/or non-volatile memory. The memory 130 may store, for example, instructions or data relevant to at least one other element of the electronic device 101. According to an embodiment, the memory 130 may store software and/or a program 140. The program 140 may include a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (for example, the bus 110, the processor 120, or the memory 130) used for executing an operation or function implemented by other programs (for example, the middleware 143, the API 145, or the application 147). Furthermore, the kernel 141 may provide an interface through which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data.

Furthermore, the middleware 143 may process one or more task requests, which are received from the application programs 147, according to priorities thereof. For example, the middleware 143 may assign priorities for using the system resources (for example, the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned to the one or more application programs.

The API 145 is an interface through which the applications 147 control functions provided from the kernel 141 or the middleware 143, and may include, for example, at least one interface or function (for example, instruction) for file control, window control, image processing, or text control.

The input/output interface 150 may function as, for example, an interface that can forward instructions or data, which are input from a user or an external device, to the other element(s) of the electronic device 101. Furthermore, the input/output interface 150 may output instructions or data, which are received from the other element(s) of the electronic device 101, to the user or the external device.

The display 160 may include, for example, a Liquid Crystal Display (LCD), a Light-Emitting Diode (LED) display, an Organic Light-Emitting Diode (OLED) display, a MicroElectroMechanical Systems (MEMS) display, and an electronic paper display. The display 160 may display, for example, various types of contents (for example, text, images, videos, icons, or symbols) to the user. The display 160 may include a touch screen and may receive, for example, a touch, gesture, proximity, or hovering input using an electronic pen or the user's body part.

The communication interface 170 may configure communication, for example, between the electronic device 101 and an external device (for example, a first external electronic device 102, a second external electronic device 104, or a server 106). For example, the communication interface 170 may be connected to a network 162 through wireless or wired communication to communicate with the external device (for example, the second external electronic device 104 or the server 106).

The wireless communication may use, for example, at least one of Long Term Evolution (LTE), LTE-Advance (LTE-A), Code Division Multiple Access (CDMA), Wideband CDMA (WCDMA), Universal Mobile Telecommunications System (UNITS), Wireless Broadband (WiBro), Global System for Mobile Communications (GSM), and the like, as a cellular communication protocol. In addition, the wireless communication may include, for example, short range communication 164. The short-range communication 164 may include at least one of, for example, Wi-Fi, Bluetooth, Near Field Communication (NFC), Global Navigation Satellite System (GNSS), and the like. The GNSS may include at least one of, for example, a Global Positioning System (GPS), a Global Navigation Satellite System (Glonass), a Beidou Navigation Satellite System (hereinafter referred to as "Beidou"), and a European Global Satellite-based Navigation System (Galileo), according to a use area, a bandwidth, or the like. Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), a Plain Old Telephone Service (POTS), and the like. The network 162 may include at least one of a communication network such as a computer network (for example, a LAN or a WAN), the Internet, and a telephone network.

The Head-Mounted-Device (HMD) 180 may be mounted on the user's head and a space for accommodating the electronic device 101 is formed therein. When image data based on 2D connects or virtual reality contents provided by the accommodated electronic device 101 is reproduced, the HMD may provide a VR image at a position close to a user's eyes. The HMD 180 may include a main frame, a cover, and a mounting member in appearance. The main frame may have a space for accommodating the electronic device 100, and may include a connector, a display position adjustor, and an input unit in appearance. The cover may be fixed to the main frame to cover the space in which the electronic device 101 is accommodated. The mounting member may be connected to the main frame to fix the HMD 180 to a human's body part (for example, head). For example, the mounting member may include a band of an elastic material, a Velcro tape, and the like. The main frame may adhere around the eyes of the user's face by the mounting member.

Each of the first and second external electronic devices 102 and 104 may be of the same or a different type from the electronic device 101. According to an embodiment, the server 106 may include a group of one or more servers. According to various embodiments, all or some of the operations executed in the electronic device 101 may be executed in another electronic device or a plurality of electronic devices (for example, the electronic devices 102 and 104 or the server 106). According to an embodiment, when the electronic device 101 has to perform some functions or services automatically or in response to a request, the electronic device 101 may make a request for performing at least some functions relating thereto to another device (for example, the electronic device 102 or 104 or the server 106) instead of performing the functions or services by itself or in addition. Another electronic device (for example, the electronic device 102 or 104, or the server 106) may execute the requested functions or the additional functions, and may deliver a result of the execution to the electronic device 101. The electronic device 101 may provide the received result as it is, or may additionally process the received result to provide the requested functions or services. To this end, for example, cloud computing, distributed computing, or client-server computing technology may be used.

Figure 2:
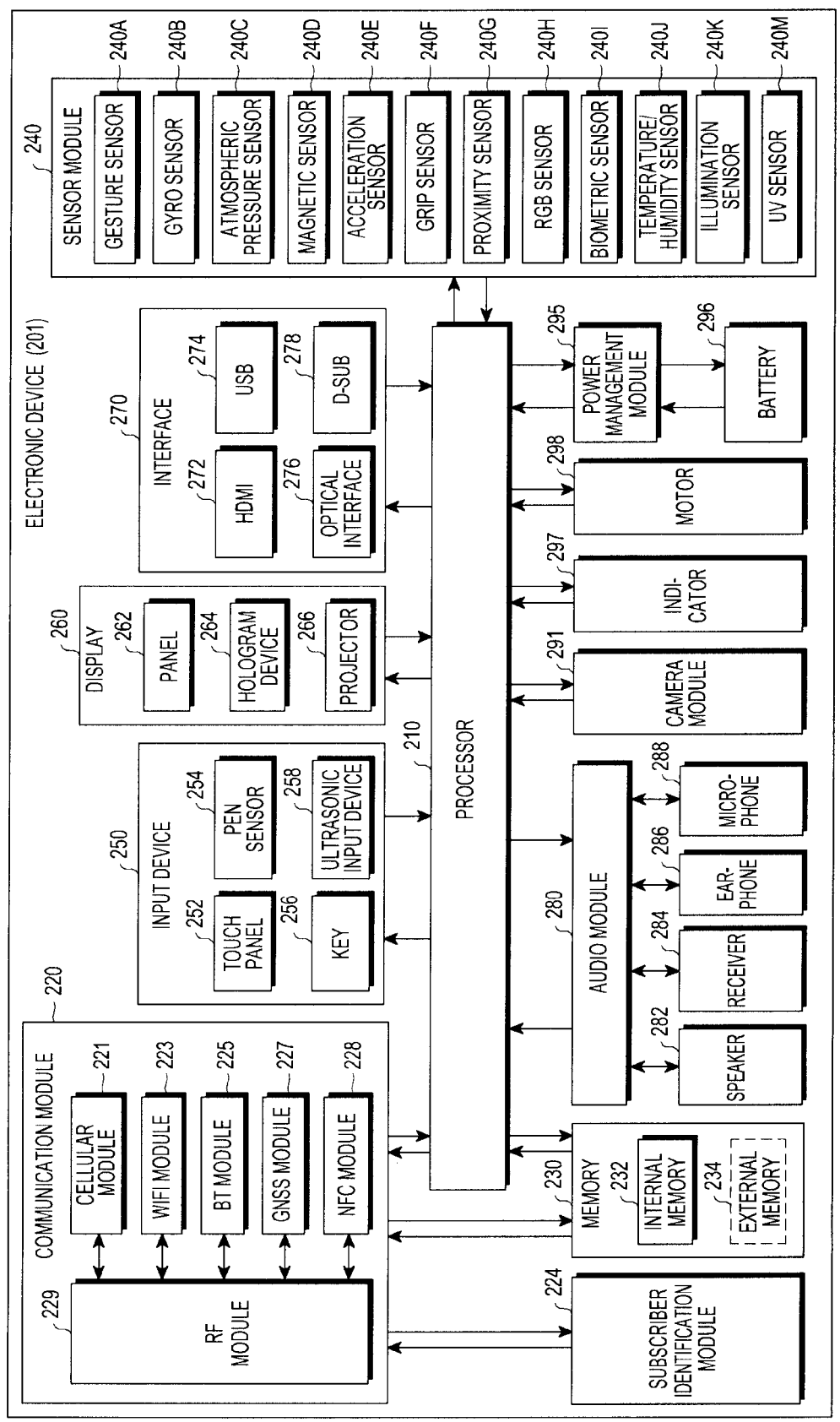
FIG. 2 is a block diagram illustrating an electronic device according to various embodiments.

FIG. 2 is a block diagram of an electronic device 201 according to various embodiments. The electronic device 201 may include, for example, the whole or part of the electronic device 101 illustrated in FIG. 1. The electronic device 201 may include at least one Application Processor (AP) 210, a communication module 220, a Subscriber Identification Module (SIM) card 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software elements connected thereto and may perform various data processing and operations by driving an operating system or an application program. The processor 210 may be embodied, for example, as a System on Chip (SoC). According to an embodiment, the processor 210 may further include a Graphic Processing Unit (GPU) and/or an image signal processor. The processor 210 may also include at least some (for example, a cellular module 221) of the elements illustrated in FIG. 2. The processor 210 may load, in a volatile memory, instructions or data received from at least one of the other elements (for example, a non-volatile memory) to process the loaded instructions or data, and may store various types of data in the non-volatile memory.

The communication module 220 may have a configuration equal or similar to that of the communication interface 170 of FIG. 1. The communication module 220 may include, for example, a cellular module 221, a Wi-Fi module 223, a BT module 225, a GNSS module 227 (for example, a GPS module, a Glonass module, a Beidou module, or a Galileo module), an NFC module 228, and a Radio Frequency (RF) module 229.

The cellular module 221 may provide, for example, a voice call, a video call, a text message service, an Internet service, or the like through a communication network. According to an embodiment, the cellular module 221 may identify and authenticate the electronic device 201 within a communication network using the subscriber identification module 224 (for example, a SIM card). According to an embodiment, the cellular module 221 may perform at least some of the functions that the processor 210 may provide. According to an embodiment, the cellular module 221 may include a Communication Processor (CP).

Each of the Wi-Fi module 223, the BT module 225, the GNSS module 227, and the NFC module 228 may include, for example, a processor for processing data transmitted and received through the corresponding module. According to some embodiments, at least some (for example, two or more) of the cellular module 221, the Wi-Fi module 223, the BT module 225, the GNSS module 227, and the NFC module 228 may be included in one Integrated Chip (IC) or IC package.

The RF module 229, for example, may transmit/receive a communication signal (for example, an RF signal). The RF module 229 may include, for example, a transceiver, a Power Amplifier Module (PAM), a frequency filter, a Low Noise Amplifier (LNA), an antenna, and the like. According to another embodiment, at least one of the cellular module 221, the Wi-Fi module 223, the BT module 225, the GPS module 227, and the NFC module 228 may transmit/receive an RF signal through a separate RF module.

The subscriber identification module 224 may include, for example, a card including a subscriber identity module and/or an embedded SIM, and may contain unique identification information (for example, an Integrated Circuit Card Identifier (ICCID)) or subscriber information (for example, an International Mobile Subscriber Identity (IMSI)).

The memory 230 (for example, the memory 130) may include, for example, an internal memory 232 or an external memory 234. The internal memory 232 may include, for example, at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard disc drive, a Solid State Drive (SSD), and the like).

The external memory 234 may further include a flash drive, for example, a Compact Flash (CF), a Secure Digital (SD), a Micro-Secure Digital (Micro-SD), a Mini-Secure Digital (Mini-SD), an extreme Digital (xD), a Multi-Media Card (MMC), a memory stick, or the like. The external memory 234 may be functionally and/or physically connected to the electronic device 201 through various interfaces.

The sensor module 240 may, for example, measure a physical quantity or detect the operating state of the electronic device 201 and may convert the measured or detected information into an electrical signal. The sensor module 240 may include, for example, at least one of a gesture sensor 240A, a gyro sensor 240B, an atmospheric pressure sensor 2240C, a magnetic sensor 2240D, an acceleration sensor 2240E, a grip sensor 2240F, a proximity sensor 2240G, a color sensor 2240H (for example, a red, green, blue (RGB) sensor), a biometric sensor 22401, a temperature/humidity sensor 240J, an illumination sensor 240K, and a ultraviolet (UV) sensor 2240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments, the electronic device 201 may further include a processor configured to control the sensor module 240 as a part of or separately from the AP 210, and may control the sensor module 240 while the AP 210 is in a sleep state.

The input device 250 may include, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. Furthermore, the touch panel 252 may further include a control circuit. The touch panel 252 may further include a tactile layer to provide a tactile reaction to a user.

The (digital) pen sensor 254 may include, for example, a recognition sheet that is a part of, or separate from, the touch panel. The key 256 may include, for example, a physical button, an optical key, or a keypad. The ultrasonic input device 258 may detect ultrasonic waves, which are generated by an input tool, through a microphone (for example, a microphone 288) to identify data corresponding to the detected ultrasonic waves.

The display 260 (for example, the display 160) may include a panel 262, a hologram device 264 or a projector 266. The panel 262 may have a configuration that is the same as, or similar to, that of the display 160 illustrated in FIG. 1. The panel 262 may be implemented to be, for example, flexible, transparent, or wearable. The panel 262, together with the touch panel 252, may be implemented as one module. The hologram device 264 may show a three dimensional image in the air by using an interference of light. The projector 266 may display an image by projecting light onto a screen. The screen may be located, for example, in the interior of, or on the exterior of, the electronic device 201. According to one embodiment, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-sub-miniature (D-sub) 278. The interface 270 may be included, for example, in the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may convert, for example, a sound into an electrical signal, and vice versa. At least some elements of the audio module 280 may be included, for example, in the input/output interface 150 illustrated in FIG. 1. The audio module 280 may process sound information that is input or output through, for example, a speaker 282, a receiver 284, earphones 286, the microphone 288, and the like.

The camera module 291 is a device that can photograph a still image and a dynamic image. According to an embodiment, the camera module 291 may include one or more image sensors (for example, a front sensor or a rear sensor), a lens, an Image Signal Processor (ISP), or a flash (for example, an LED, a xenon lamp, etc.).

The power management module 295 may manage, for example, the power of the electronic device 201. According to an embodiment, the power management module 295 may include a Power Management Integrated Circuit (PMIC), a charger Integrated Circuit (IC), or a battery or fuel gauge. The PMIC may use a wired and/or wireless charging method. Examples of the wireless charging method may include a magnetic resonance method, a magnetic induction method, an electromagnetic wave method, and the like. Additional circuits (for example, a coil loop, a resonance circuit, a rectifier, and the like) for wireless charging may be further included. The battery gauge may measure, for example, the residual amount of the battery 296 and a voltage, current, or temperature while charging. The battery 296 may include, for example, a rechargeable battery and/or a solar battery.

The indicator 297 may indicate a particular state (for example, a booting state, a message state, a charging state, and the like) of the electronic device 201 or a part (for example, the processor 210) thereof. The motor 298 may convert an electrical signal into a mechanical vibration and may generate a vibration, a haptic effect, and the like. Although not illustrated, the electronic device 201 may include a processing unit (for example, a GPU) for supporting mobile TV. The processing unit for supporting the mobile TV may process media data according to a standard, such as Digital Multimedia Broadcasting (DMB), Digital Video Broadcasting (DVB), MediaFlo™, and the like.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
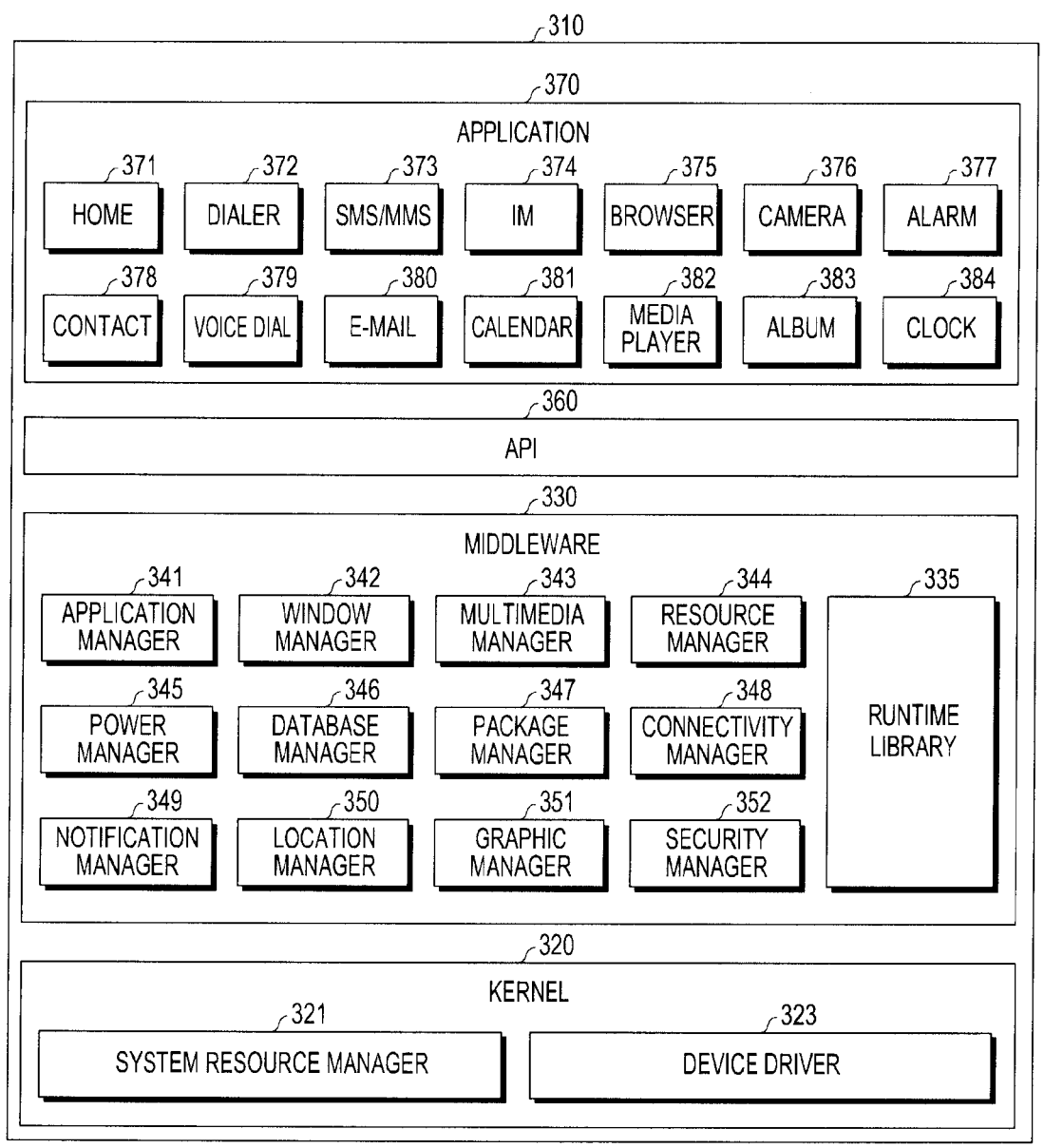
FIG. 3 is a block diagram of a program module according to various embodiments.

FIG. 3 is a block diagram of a program module according to various embodiments. According to an embodiment, the program module 310 (for example, the program 140) may include an Operating System (OS) for controlling resources related to the electronic device (for example, the electronic device 101) and/or various applications (for example, the application programs 147) executed in the operating system. The operating system may be, for example, Android, iOS, Windows, Symbian, Tizen, Bada, and the like.

The program module 310 may include a kernel 320, middleware 330, an Application Programming Interface (API) 360, and/or applications 370. At least a part of the program module 310 may be preloaded on the electronic device, or may be downloaded from an external electronic device (for example, the electronic device 102 or 104, or the server 106).

The kernel 320 (for example, the kernel 141) may include, for example, a system resource manager 321 and/or a device driver 323. The system resource manager 321 may control, allocate, or retrieve system resources. According to an embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide, for example, a function required by the applications 370 in common, or may provide various functions to the applications 370 through the API 360 such that the applications 370 can efficiently use limited system resources within the electronic device. According to an embodiment, the middleware 330 (for example, the middleware 143A) may include at least one of, for example, a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function through a programming language while the applications 370 are being executed. The runtime library 335 may perform input/output management, memory management, the functionality for an arithmetic function, and the like.

The application manager 341 may manage, for example, the life cycle of at least one of the applications 370. The window manager 342 may manage Graphical User Interface (GUI) resources used on a screen. The multimedia manager 343 may determine formats required to reproduce various media files and may encode or decode a media file using a coder/decoder (codec) appropriate for the corresponding format. The resource manager 344 may manage resources, such as the source code, the memory, the storage space, and the like of at least one of the applications 370.

The power manager 345 may operate together with, for example, a Basic Input/Output System (BIOS) to manage a battery or power and provide power information required for the operation of the electronic device. The database manager 346 may generate, probe, or change a database to be used by at least one of the applications 370. The package manager 347 may manage the installation or update of an application that is distributed in the form of a package file.

The connectivity manager 348 may manage a wireless connection, such as Wi-Fi, Bluetooth, and the like. The notification manager 349 may display or notify of an event, such as an arrival message, an appointment, a proximity notification, and the like, in such a manner as not to disturb a user. The location manager 350 may manage the location information of the electronic device. The graphic manager 351 may manage a graphic effect to be provided to a user and a user interface relating to the graphic effect. The security manager 352 may provide various security functions required for system security, user authentication, and the like. According to an embodiment, in a case where the electronic device (for example, the electronic device 101) has a telephone call function, the middleware 330 may further include a telephony manager for managing a voice or video call function of the electronic device.

The middleware 330 may include a middleware module that forms a combination of various functions of the above-described elements. The middleware 330 may provide specialized modules according to the types of operating systems in order to provide differentiated functions. Furthermore, the middleware 330 may dynamically remove some of the existing elements, or may add new elements.

The API 360 (for example, the API 145) is, for example, a set of API programming functions, and may be provided with different configurations according to operating systems. For example, in the case of Android or iOS, one API set may be provided for each platform, and in the case of Tizen, two or more API sets may be provided for each platform.

The applications 370 (for example, the application programs 147) may include, for example, one or more applications that can perform functions, such as home 371, dialer 372, SMS/MMS 373, Instant Message (IM) 374, browser 375, camera 376, alarm 377, contacts 378, voice dialer 379, e-mail 380, calendar 381, media player 382, album 383, clock 384, health care (for example, measure exercise quantity or blood sugar), or environment information (for example, atmospheric pressure, humidity, temperature information or the like).

According to an embodiment, the applications 370 may include an application (hereinafter, referred to as an "information exchange application" for convenience of description) supporting information exchange between the electronic device (for example, the electronic device 101) and an external electronic device (for example, the electronic device 102 or 104). The information exchange application may include, for example, a notification relay application for transferring specific information to an external electronic device or a device management application for managing an external electronic device.

For example, the notification relay application may include a function of delivering, to the external electronic device (for example, the electronic device 102 or 104), notification information generated by other applications (for example, an SMS/MMS application, an email application, a health care application, an environmental information application, and the like) of the electronic device 101. Furthermore, the notification relay application may, for example, receive notification information from the external electronic device and may provide the received notification information to a user.

The device management application may manage (for example, install, delete, or update), for example, at least one function of an external electronic device (for example, the electronic device 102 or 104) that communicates with the electronic device (for example, a function of turning on/off the external electronic device itself (or some components thereof) or a function of adjusting the brightness (or resolution) of a display), applications that operate in the external electronic device, or services (for example, a call service, a message service, and the like) that are provided by the external electronic device.

According to an embodiment, the applications 370 may include applications (for example, a health care application of a mobile medical appliance, and the like) that are specified according to attributes of an external electronic device (for example, the electronic device 102 or 104). According to an embodiment, the applications 370 may include an application received from the external electronic device (for example, the server 106, or the electronic device 102 or 104). According to an embodiment, the applications 370 may include preloaded applications or third-party applications that can be downloaded from a server. Names of the elements of the program module 310, according to the above-described embodiments of the present disclosure, may change depending on the type of OS.

According to various embodiments, at least a part of the program module 310 may be implemented in software, firmware, hardware, or a combination of two or more thereof. At least some of the program module 310 may be implemented (for example, executed) by, for example, the processor (for example, the processor 210). At least some of the program module 310 may include, for example, a module, a program, a routine, a set of instructions, and/or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added. Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

Figure 4:
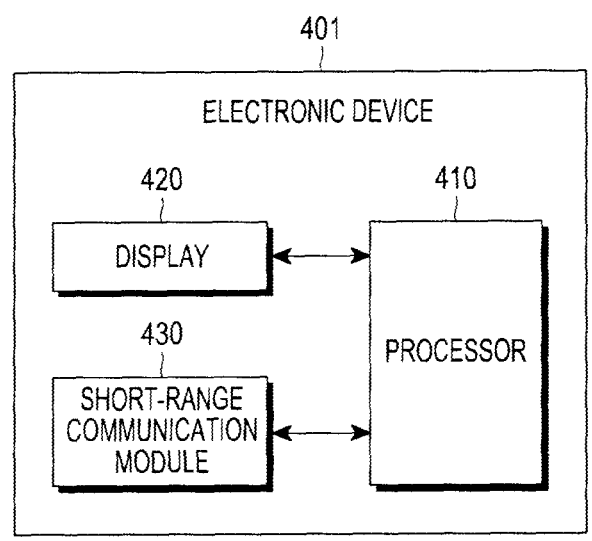
FIG. 4 is a block diagram illustrating an electronic device according to various embodiments.

FIG. 4 is a block diagram illustrating an electronic device according to various embodiments.

Referring to FIG. 4, an electronic device 401 (the electronic device 101 of FIG. 1) may include a processor 410, a display 420, and a short-range communication module 430.

According to various embodiments, the electronic device 401 may be an electronic device that supports Wi-Fi Direct (or Wi-Fi Peer to Peer), and the processor 410 may form a P2P group by a connection between the electronic device 401 and another electronic device through Wi-Fi Direct and a formation process of the P2P group. This process may be described hereinbelow.

(1) Wi-Fi Direct Discovery(or P2P Discovery): a discovery operation of the electronic device In order to generate the P2P group through the Wi-Fi P2P connection, the electronic device 401 requires an operation of first detecting the existence of an electronic device to be connected to, which may be referred to a discovery operation of the electronic device.

The discovery operation of the electronic device uses P2P discovery, and the P2P discovery acquires required information through an exchange of a probe request signal and a probe response signal between electronic devices In the discovery operation of the electronic device, the electronic device may discovery a counterpart electronic device for the Wi-Fi Direct connection through technology such as BLE, NFC, and BT as well as Wi-Fi Direct Discovery, and then switch to a Wi-Fi Direct connection operation.

In another example, Wi-Fi alliance has recently developed low power Discovery technology based on a non-connection such as NAN(Neighbor Awareness Networking, Marketing name: Wi-Fi Aware) as the standard. The NAN technology is Wi-Fi-based low power discovery technology by which electronic devices are synchronized with the network corresponding to a NAN cluster and exchange beacons and service discovery frames within a synchronized Discovered Window (DW). In sections other than the DW, the electronic devices may remain in a sleep state and thus always maintain a discovery state with low power. Further, various applications for exchanging services and information between adjacent electronic devices may be developed.

For example, Wi-Fi electronic devices that support the NAN may operate to be synchronized by the same DW (time and frequency) and exchange beacons and service discovery frames within the DW. However, in the NAN standard, it is not defined that service discovery frames are exchanged only in the DW. The electronic device may designate an active time interval in the section between DWs and perform additional service discovery during this period. The additional section between DWs may be used for a legacy Wi-Fi connection and a discovery process by designating an operation for Wi-Fi Direct, mesh, IBSS, and WLAN connections as well the additional service discovery.

(2) provision discovery exchange: connection method determination operation

When the existence of an electronic device desired to be connected is identified through a discovery operation of the electronic device, the electronic device 401 executes a connection method determination (provision discovery) operation with another electronic device that desires a first connection.

For example, the electronic device may transmit a WSC configuration method in a desired connection scheme to the other electronic device that desires to be connected through a connection method request (provision discovery request) signal, and the other electronic device having received the signal may trigger the user through a popup. The popup may include information such as a device name of the electronic device 401 having made the request for connection method determination (provision discovery), and thus the other electronic device perform a connection accept control operation to inquire about whether to accept the connection or, to display a pin value required for WSC or to activate an input window.

In another example, the WSC configuration method used for the connection method determination (provision discovery) operation may include PBC, PIN from display, and PIN from keyboard. When the connection is accepted, the other electronic device having received the connection request in the PIN from display scheme may trigger the user while displaying the WSC PIN. Further, in the PIN from keyboard scheme, the other electronic device may trigger the user by popping up a window for allowing the user to input the PIN.

(3) group owner negotiation: role determination operation

When the connection method determination (provision discovery) operation is completed, a role determination (group owner negotiation) operation may be performed between the electronic device 401 and other electronic devices connected to the electronic device through Wi-Fi Direct. In the Wi-Fi direct connection, an AP is not necessary, but an operation for determining an electronic device, which serves as the AP, may be dynamically performed.

For example, a role determination (group owner negotiation) operation process may be completed by a role determination request/response (GO negotiation request/response) and an exchange of confirm frames. At this time, both electronic devices may compare group owner intent values designed by the respective electronic devices, and the electronic device that desires the larger value may serve as the group owner. According to another example, attributes of the P2P group generated after the connection, an operating channel, and listening timing may be determined through the operation.

(4) provisioning: authentication information exchange operation

When the role determination (group owner negotiation) operation is completed, the electronic device of the group owner may operate as a WSC register and the electronic device of the group client may operate as a WSC enrollee, in which case an authentication information exchange (provisioning) operation may be performed there between to exchange credential. When the operation is completed, two electronic devices may complete a group formation operation for forming the P2P group.

When the group formation operation is completed, the electronic device of the group owner may move to an actual operating channel and start serving as the group owner and the electronic device of the group client may access the electronic device of the group owner with the credentials identified through the authentication information exchange (provisioning) operation and finally form the connection between two W-Fi P2P electronic devices via a 4-way handshake operation.

Alternatively, in order to increase a connection speed, the credentials or key values for the 4-way handshake operation may be exchanged through a particular algorithm without the WSC operation (connection method determination operation and role determination operation). In this case, the WSC operation may be omitted, and the following process in which the electronic device of the group client accesses the electronic device of the group owner and finally forms the connection through the 4-way handshake operation may be the same.

*Persistent Group

In the role determination operation (group owner negotiation), two electronic devices determine whether to from a persistent group or a temporary group. When it is determined to form the persistent group, two electronic devices may automatically store credential (authentication type, encryption type, network key, and ssid) and/or the role in the persistent group (group owner or group client). That is, when the two electronic devices are connected again according to a connection request from the user, the electronic device having the credential stored therein may directly generate a group without a process such as the connection method determination (provision discovery) operation and the role determination (group owner negotiation, provisioning) operation, thereby increasing the connection speed. More specifically, when an electronic device that desires the connection corresponds to the electronic device previously designated as the persistent group among electronic devices found through a discovery process, the electronic device of the group owner may directly generate the group through an exchange of invitation request/response signals including attributes of the previous group without the above-described connection operations, and the electronic device of the group client directly accesses through the stored credential, so that the connection speed can increase.

*Invitation Process

When the electronic device 401 needs communication with another electronic device that desires a connection in a state where the electronic device 401 already belongs to any P2P group, the electronic device 401 may end the connection of the existing P2P group and generate a new P2P group with the other electronic device that desires the connection. However, for a case where the connection with the existing P2P group should be effective, the electronic device already belonging to the P2P group searches for an electronic device that desires the connection through a discovery operation and invites the discovered electronic device through an invitation request signal including a current group ID and attribute information. The invited electronic device may transmit an invitation response signal, and when the invitation is accepted, may be connected to the electronic device of the group owner in the invited group. At this time, the invitation request signal may be transmitted by all electronic devices that desire the connection regardless of the roles of the group owner and the group client in the corresponding group.

The electronic device 401 of FIG. 4 according to various embodiments of the present disclosure may be the first electronic device, which is the group client connected to the P2P group, the second electronic device, which is not connected to the P2P group, or the third electronic device, which is the group owner connected to the P2P group. In the following various embodiments, each of an operation for performing functions of the first electronic device, an operation for performing functions of the second electronic device, and an operation for performing the third electronic device will be described.

According to various embodiments, when the electronic device (the electronic device 401 of FIG. 4) is determined as the first electronic device that serves as the group client in the P2P group and a connection request is made from the second electronic device that is not connected to the P2P group, the processor (the processor 410 of FIG. 4) may transmit a signal including information for inducing the connection to third electronic device that is the group owner of the P2P group to the second electronic device. The signal transmitted to the second electronic device may correspond to an invitation signal including forwarding invitation information for inducing the connection to the third electronic device that is the group owner.

According to an embodiment, when receiving the connection request from the second electronic device, the processor 410 may determine a connection method through a connection method determination (provision discovery exchange) operation with the second electronic device and transmit a role determination response (GO negotiation response) signal including a fail code to the second electronic device in response to reception of a role determination request (GO negotiation request) signal from the second electronic device. The processor 410 may display information related to the connection request from the second electronic device in at least a partial area of the display 420 by controlling the display 420, and when the connection is accepted by the user, transmit an invitation signal including forwarding invitation information for inducing the connection to the third electronic device, which is the group owner of the P2P group, to the second electronic device.

According to an embodiment, an invitation request/response signal corresponding to the invitation signal may be a message already defined in the Wi-Fi Direct standard, which may maintain compatibility.

According to an embodiment, a forwarding invitation capability field may be added to the invitation request signal, and forwarding invitation information for inducing the connection to the group owner may be included in the field. The forwarding invitation information may include flag information indicating forwarding invitation and connection accept information (whether to accept the connection of the second electronic device and connection method information) controlled by the group client. Further, the invitation request signal may include information (for example, a group ID, a BSSID, and channel information) on the third electronic device, which is the group owner, and information on the first electronic device, which is the group client for transmitting the invitation request signal.

According to an embodiment, after transmitting the role determination response (GO negotiation response) signal including the fail code to the second electronic device in response to the reception of the role determination request (GO negotiation request) signal from the second electronic device, the processor 410 may transmit the invitation signal including forwarding invitation information for inducing the connection to the third electronic device, which is the group owner of the P2P group, to the second electronic device while informing of the connection request from the second electronic device in at least a partial area of the display 420 by controlling the display 420.

According to an embodiment, after transmitting the invitation signal to the second electronic device, the processor 410 may transmit at least one piece of information (for example, a device address, a device type, a device name, and the like) on the second electronic device and connection accept information of the second electronic device to the third electronic device.

According to an embodiment, after transmitting the invitation signal to the second electronic device, the processor 410 may identify a connection between the second electronic device and the third electronic device through a signal including at least one client information descriptor received from the third electronic device through a periodic scan operation.

According to an embodiment, after transmitting the invitation signal to the second electronic device, the processor 410 may identify the connection between the second electronic device and the third electronic device through the signal including at least one client information descriptor received from the third electronic device without any periodic scan operation.

The client information descriptor corresponds to information on an electronic device of a group client connected to the P2P group, and one client information descriptor may indicate information on an electronic device of one group client.

FIG. 5 illustrates a client information descriptor according to various embodiments of the present disclosure. For example, the client information descriptor may include various pieces of information on an electronic device of the corresponding group client, and a detailed description of the various pieces of information will be omitted for simplicity since the information is readily provided in the Wi-Fi Direct specification.

The client information descriptor is generated in accordance with the number of group clients connected to the P2P group. When the second electronic device is connected to the P2P group, the third electronic device, which is the owner of the P2P group, may generate the client information descriptor corresponding to the second electronic device and transmit a separate signal including at least one updated client information descriptor to the electronic device 401 (first electronic device).

According to various embodiments, when the electronic device (the electronic device 401 of FIG. 4) corresponds to the second electronic device, which does not belong to the P2P group and receives a signal including information for inducing a connection to the third electronic device which is the group owner of the P2P group, from the first electronic device having made the request for the connection (which is determined as the electronic device of the group client), the processor (the processor 410 of FIG. 4) may make a request for the connection to the third electronic device based on the signal. The signal received from the first electronic device may correspond to an invitation signal including forwarding invitation information for inducing the connection to the third electronic device, which is the group owner.

According to an embodiment, the processor 410 may perform a connection method determination (provision discovery exchange) operation with the first electronic device found through a search for an electronic device for a Wi-Fi Direct connection and receive a role determination response (GO negotiation response) signal including a fail code in response to a role determination request (GO negotiation request) signal transmitted to the first electronic device.

According to an embodiment, when the processor 410 receives an invitation signal including the forwarding invitation information within a preset time after receiving the role determination response (GO negotiation response) signal, the processor 410 identifies the third electronic device based on information (for example, a group ID, a BSSID, a channel, and the like) on the third electronic device, which is the group owner, included in the invitation signal. The processor 410 may detect the forwarding invitation information in the received invitation signal, insert the detected forwarding invitation information into a connection method determination request (provision discovery request) signal, and transmit the connection method determination request (provision discovery request) signal including the forwarding invitation information to the third electronic device.

According to an embodiment, when the invitation signal including the forwarding invitation information is not received within the preset time after the role determination response (GO negotiation response) signal is received, the processor 410 may end the connection attempt with the first electronic device.

According to an embodiment, when the invitation signal is received, the processor 410 may inform of the connection to the third electronic device in at least a partial area of the display 420 and display information related to the request for the connection to the third electronic device through a UI.

According to an embodiment, when the invitation signal is received, the processor 410 may display a popup window that inquire about whether to accept the connection to the third electronic device in at least a partial area of the display 420, and when the user accepts the connection, make a request for the connection to the third electronic device.

According to various embodiments, when the electronic device (for example, the electronic device 401 of FIG. 4) is determined as the third electronic device that serves as the group owner in the P2P group and a signal including information for inducing the connection to the third electronic device is received from the second electronic device that is not connected to the P2P group, the processor (for example, the processor 410 of FIG. 4) may perform a short-range communication connection operation with the second electronic device. The signal received from the second electronic device may correspond to an invitation signal including forwarding invitation information for inducing the connection to the third electronic device, which is the group owner.

According to an embodiment, when a connection method determination request (provision discovery request) signal including the forwarding invitation information is received from the second electronic device, the processor 410 may perform a connection operation with the second electronic device.

According to an embodiment, when the connection method determination request (provision discovery request) signal including the forwarding invitation information is received from the second electronic device and information (for example, a device address, a device type, a device name, and the like) on the second electronic device included in the connection method determination request (provision discovery request) signal matches information (for example, a device address, a device type, a device name, and the like) on the second electronic device received along with connection accept information from the first electronic device, which is the group client of the P2P group, the processor 410 may perform the connection operation with the second electronic device.

According to an embodiment, the processor 410 may display information informing that the connection to the second electronic device is being made in at least a partial area of the display 420 by controlling the display 420 while the connection operation is performed with the second electronic device.

According to an embodiment, when the connection to the second electronic device is made and the number of group clients, which can be connected to the third electronic device, is exceeded, the processor 410 may display information related to the excess of the number of connections in at least a partial area of the display 420. When the connection to the second electronic device is accepted by the user of the third electronic device, the processor 410 may end a connection with a predetermined electronic device among electronic devices of at least one group client connected to the third electronic device. The processor 410 may display a list of at least one group client connected to the P2P group in at least a partial area of the display 420 by controlling the display 420 and end a connection with the electronic device of the group client selected from the list. Alternatively, the processor 410 may display information related to an end of a connection with a group client, which has been connected for the longest time or is connected most recently, among at least one group client connected to the P2P group in at least a partial area of the display 420.

According to an embodiment, when short-range communication with the second electronic device is connected, the processor 410 may generate a client information descriptor corresponding to the second electronic device and transmit a separate signal including all client information descriptors having the newly generated client information descriptor to the first electronic device.

According to various embodiments, when the electronic device (the electronic device 401 of FIG. 4) is the second electronic device, which does not belong to the P2P group, the processor (the processor 410 of FIG. 4) may receive connection information indicating the connection to the third electronic device from the third electronic device, which is the group owner of the P2P group, among the electronic devices found through a discovery operation of the electronic device.

According to an embodiment, the processor 410 may detect information on electronic devices of at least one group client included in a probe response signal received from the third electronic device among the electronic devices found through the discovery operation of the electronic device, that is, detect at least one client information descriptor.

According to an embodiment, the processor 410 may detect, as the electronic device of the group owner, the third electronic device having transmitted the probe response signal including the at least one client information descriptor among the electronic device found through the discovery operation of the electronic device.

According to an embodiment, the processor 410 may detect, as the first electronic device, which is the electronic device of the group client, at least an electronic device corresponding to the at least one client information descriptor among the electronic devices found through the discovery operation of the electronic device.

According to an embodiment, the processor 410 may detect the remaining electronic devices, which do not transmit the probe response signal including the at least one client information descriptor, and which do not correspond to the at least one client information descriptor, as electronic devices, which are not connected to the P2P group, among the electronic devices found through the discovery operation of the electronic device.

According to an embodiment, when a request for the connection to the first electronic device corresponding to the electronic device of the group client is made among the found electronic devices, the processor 410 may identify the third electronic device, which is the group owner of the P2P group to which the first electronic device is connected, and make a request for the connection to the third electronic device based on information on the third electronic device included in the probe response signal received from the third electronic device.

According to various embodiments, when the electronic device (the electronic device 401 of FIG. 4) is the second electronic device, which does not belong to the P2P group, the processor (the processor 410 of FIG. 4) may receive connection information indicating the connection to the third electronic device, which is the group owner of the P2P group, from at least one first electronic device, which is the group client of the P2P group, among the electronic devices found through the discovery operation of the electronic device.

According to an embodiment, the processor 410 may detect information on the group owner included in the probe response signal received from at least one first electronic device among the electronic devices found through the discovery operation of the electronic device.

According to an embodiment, when a request for the connection to the first electronic device corresponding to the electronic device of the group client is made among the found electronic devices, the processor 410 may identify the third electronic device based on information on the third electronic device included in the probe response signal received from the first electronic device and make a request for the connection to the third electronic device.

According to various embodiments, the display 420 may be, for example, the display 160 illustrated in FIG. 1.

According to an embodiment, when the electronic device is determined as the first electronic device of the group client in the P2P group, the electronic device (the electronic device 401 of FIG. 4) may inform of the connection with the electronic device, which is not connected to the P2P group, and display information for controlling connection accept in at least a partial area of the display 420.

According to an embodiment, when the electronic device is determined as the third electronic device, which is the group owner in the P2P group, the electronic device may display information informing that the second electronic device having made the request for the connection to the first electronic device, which is the group client, and the third electronic device are currently connected in at least a partial area of the display 420.

According to an embodiment, when the electronic device is the second electronic device, which does not belong to the P2P group, the electronic device may inform of the connection with the third electronic device, which is the group owner of the first electronic device, in at least a partial area of the display 420.

According to various embodiments, the communication circuit (the communication module 220 of FIG. 2) may include the short-range communication module 430, and the short-range communication module 430 may include, for example, at least one of the Wi-Fi module 223, the BT module 225, and/or the NFC module 228 illustrated in FIG. 2.

According to various embodiments, the electronic device (the electronic device 401 of FIG. 4) may include the display 420, the communication circuit (the communication module 220 of FIG. 2), a processor electrically connected to the display and the communication circuit, and a memory electrically connected to the processor, and the processor receives a short-range communication connection request from a first electronic device through the communication circuit and transmits a signal including information for inducing a connection to a second electronic device, which is a group owner to which the electronic device is connected, to the first electronic device based on the received short-range communication connection request.

According to various embodiments, the processor 410 displays information related to the connection request in at least a partial area of the display based on the received short-range communication connection request, and when the connection is accepted by a user of the electronic device, transmits the signal to the first electronic device.

According to various embodiments, the signal may correspond to an invitation signal including forwarding invitation information for inducing the connection to the second electronic device and information on the second electronic device.

According to various embodiments, the processor 410 may transmit a signal including at least one piece of information on the first electronic device and connection accept information of the first electronic device to the second electronic device.

According to various embodiments, the processor 410 may monitor whether the first electronic device is connected to the second electronic device, and when the connection between the first electronic device and the second electronic device is identified based on a result of the monitoring, display information related to the connection between the first electronic device and the second electronic device in at least a partial area of the display.

According to various embodiments, the processor 410 may identify the connection between the first electronic device and the second electronic device through reception of a signal including information on an electronic device of at least one group client connected to the second electronic device from the second electronic device.

According to various embodiments, a short-range communication connection system may include a first electronic device 600 for, when receiving a signal including information for inducing a connection to a third electronic device 700, which is a group owner to which a second electronic device 500 is connected, from the second electronic device 500 in response to a short-range communication connection request, making a request for the connection to the third electronic device, the second electronic device 500, which is a group client, for, when receiving the short-range communication connection request from the first electronic device 600, transmitting the signal including the information for inducing the connection to the third electronic device 700 to the first electronic device 600, and the third electronic device 700, which is the group owner, for, when receiving the signal including the information for inducing the connection to the third electronic device 700 from the first electronic device 600, making the short-range communication connection with the first electronic device 600.

According to various embodiments, when the first electronic device 600 does not receive the signal including the information for inducing the connection to the third electronic device within a preset time after receiving a role determination response (GO negotiation response) signal including a fail code from the second electronic device, the first electronic device 600 may end the connection with the second electronic device.

According to various embodiments, the signal, which the first electronic device 600 receives from the second electronic device, may correspond to an invitation signal including forwarding invitation information for inducing the connection to the third electronic device and information on the third electronic device.

According to various embodiments, when receiving a short-range communication connection request from the first electronic device, the second electronic device 500 may display information related to the connection request in at least a partial area of a display, and when the connection is accepted by a user of the electronic device, transmit the signal to the first electronic device.

According to various embodiments, the signal, which the second electronic device 500 transmits to the first electronic device, may correspond to an invitation signal including forwarding invitation information for inducing the connection to the third electronic device and information on the third electronic device.

According to various embodiments, the second electronic device 500 may transmit a signal including at least one piece of information on the first electronic device and connection accept information of the first electronic device to the third electronic device, monitor whether the first electronic device is connected to the third electronic device, and when the connection between the first electronic device and the third electronic device is identified based on a result of the monitoring, display information related to the connection between the first electronic device and the third electronic device in at least a partial area of a display.

According to various embodiments, the second electronic device 500 may identify the connection between first electronic device and the third electronic device based on reception of a signal including information on an electronic device of at least one group client connected to the third electronic device from the third electronic device.

According to various embodiments, the signal, which the third electronic device 700 receives from the first electronic device, may correspond to a connection method determination request (provision discovery request) signal including forwarding invitation information for inducing the connection to the third electronic device and information on the first electronic device.

According to various embodiments, when the number of group clients exceeds the number of group clients, which can be connected to the third electronic device in the connection with the first electronic device, the third electronic device 700 may display information related to the excess of the number of connections in at least a partial area of a display for a user of the third electronic device, and when the connection with the first electronic device is accepted by the user of the third electronic device, end a connection with a predetermined electronic device among electronic devices of at least one group client connected to the third electronic device.

According to various embodiments, when short-range communication with the first electronic device is connected, the third electronic device 700 may update information on an electronic device of at least one group client connected to the third electronic device and transmit the updated information to the electronic device of the at least one group client.

According to various embodiments, the electronic device (the electronic device 401 of FIG. 4) includes the display 420, the communication circuit (the communication module 220 of FIG. 2), the processor 410 electrically connected to the display and the communication circuit, and the memory electrically connected to the processor, and the processor 410 receives connection information indicating a connection with a first electronic device, which is a group owner, from at least one of electronic devices found by a search for an electronic device for a short-range communication connection through the communication circuit, and when a request for a connection to a second electronic device, which is a group client among the found electronic devices, is made, makes a request for the short-range communication connection to the first electronic device, to which the second electronic device is connected, based on the connection information received through the communication circuit.

According to various embodiments, when receiving the connection information including information on at least one second electronic device from the first electronic device among the found electronic devices, the processor 410 may detect at least one electronic device corresponding to the information on the at least one second electronic device included in the connection information among the found electronic devices as the second electronic device.

According to various embodiments, the processor 410 may receive the connection information including information on the first electronic device, which is the group owner, from at least one first electronic device among the found electronic devices.

Figure 6:
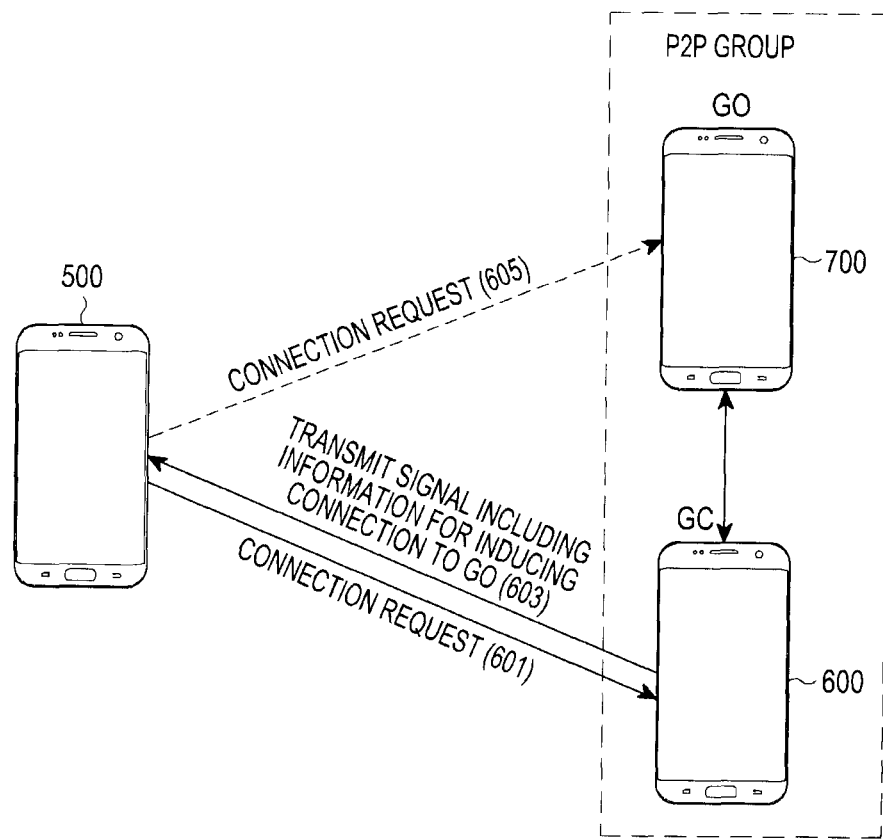
FIG. 6 illustrates an operation for a short-range communication connection in a system for the short-range communication connection according to a first embodiment of the present disclosure.

FIG. 6 illustrates an operation for a short-range communication connection in a system according to a first embodiment of the present disclosure.

In FIG. 6, each of a second electronic device 500, a first electronic device 600, and a third electronic device 700 may include the same elements as those of the electronic device of FIG. 4.

As shown, the first electronic device 600 and the third electronic device 700 are in a state where a P2P group is formed, and the first electronic device 600 is determined as a client of the group and the third electronic device 700 is determined as an owner of the group in the P2P group.

Briefly, when the second electronic device 500 that is not in the P2P group makes a request for a Wi-Fi direct connection to the first electronic device 600 in operation 601, the first electronic device 600 transmits, to the second electronic device 500, a signal including information for inducing or specifying the connection to the third electronic device 700 corresponding to the owner of the group to which the first electronic device is connected in operation 603.

When the second electronic device 500 receives the signal including the information for inducing the connection to the third electronic device 700 from the first electronic device 600, the second electronic device 500 may transmit, to the third electronic device 700, a connection method determination request signal including the information for inducing the connection to the third electronic device, so as to make a request for the connection in operation 605.

Thereafter, when the second electronic device 500 is connected to the third electronic device 700 and thus belongs to the P2P group, in response, the second electronic device 500 may be connected to the first electronic device 600.

Hereinafter, the operation for the short-range communication described in FIG. 6 will be described in more detail with reference to FIG. 7.

Figure 7:
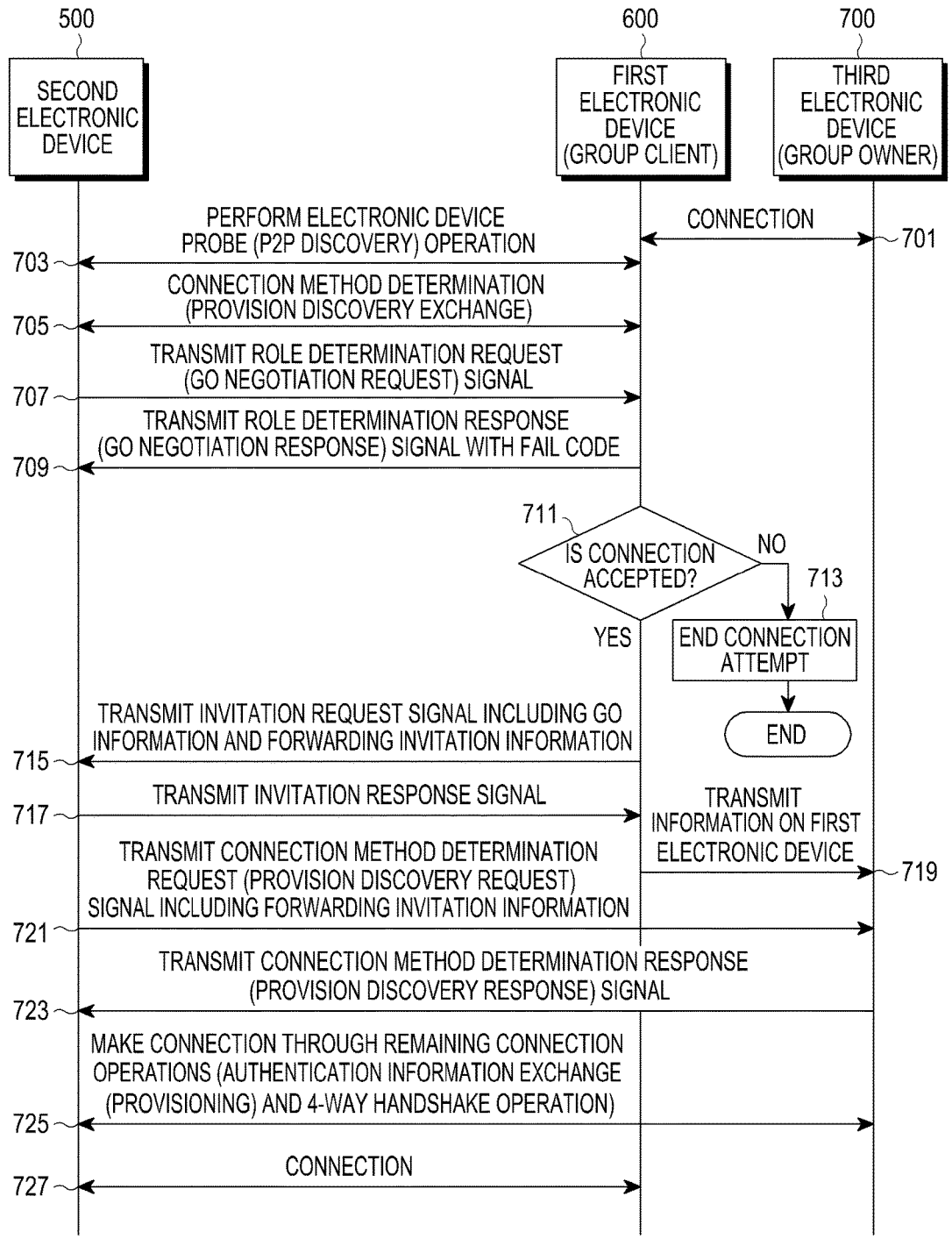
FIG. 7 is a flowchart illustrating in detail the operation for the short-range communication connection in the system for the short-range communication connection according to the first embodiment of the present disclosure.

FIG. 7 is a flowchart illustrating in detail the operation for the short-range communication connection in the system according to the first embodiment of the present disclosure.

Referring to FIG. 7, in operation 701, the first electronic device 600 and the third electronic device 700 are connected to each other to form the P2P group, and the first electronic device 600 is determined to serve as the client of the group and the third electronic device 700 is determined to serve as the owner of the group in the P2P group.

In operation 703, the second electronic device 500 that is not connected to the P2P group may transmit a probe request signal and identify the existence of the first electronic device 600 through a probe (P2P discovery) of the electronic device for receiving a probe response signal.

In operation 705, the second electronic device 500 may perform a connection method determination exchange (provision discovery exchange) operation to start a connection request with the first electronic device 600, the existence of which has been identified earlier. The connection method determination exchange (provision discovery exchange) operation corresponds to an operation in which the second electronic device 500 transmits a connection method determination request (provision discovery request) signal to the first electronic device 600 and in response, receives a connection method determination response (provision discovery response) signal from the first electronic device 600.

In operation 707, the second electronic device 500 may transmit a role determination request (GO negotiation request) signal to the first electronic device 600.

In operation 709, the first electronic device 600 may transmit a role determination response (GO negotiation response) signal to the second electronic device 500 in response to the role determination request (GO negotiation request) signal. Here, the role determination response (GO negotiation response) signal contains a fail code since the first electronic device 600 is the group client.

In operation 711, the first electronic device 600 may inform the user of the connection request from the second electronic device 500 by controlling a display of the first electronic device 600 to display a message that inquire about whether to accept the connection request from the second electronic device 500.

When the connection of the second electronic device 500 is not accepted in operation 711, no signal is transmitted to the second electronic device 500 and thus the connection attempt may end in operation 713.

When the connection of the second electronic device 500 is accepted in operation 711 by the user, the first electronic device 600 may transmit an invitation request signal containing forwarding invitation information for inducing the connection to the third electronic device 700, which is the group owner, to the second electronic device 500 in operation 715. The invitation request signal may include a forwarding invitation capability field and store forwarding invitation information for inducing the connection to the group owner in the field, and the forwarding invitation information may include flag information indicating forwarding invitation and connection accept information (whether to accept the connection and WSC information (connection method information)) controlled by the first electronic device 600. The invitation request signal includes information on the first electronic device 600, which transmits the signal, and information (group ID, BSSID, channel, and the like) on the third electronic device 700 corresponding to the group owner to which the first electronic device 600 is connected.

In operation 717, the second electronic device 500 may transmit an invitation response signal to the first electronic device 600 in response to the invitation request signal.

When the first electronic device 600 receives the invitation response signal from the second electronic device 500, the first electronic device 600 may transmit information (for example, device address, device type, device name, and the like) on the second electronic device and second electronic device connection accept information of the first electronic device to the third electronic device 700 in operation 719.

In operation 721, the second electronic device 500 detects forwarding invitation information in the forwarding invitation capability field of the invitation signal received from the first electronic device 600, insert the detected forwarding invitation information into a connection method determination request (provision discovery request) signal, and transmits the connection method determination request (provision discovery request) signal including the forwarding invitation information to the third electronic device 700 based on information on the third electronic device 700 corresponding to the group owner included in the invitation signal.

When the third electronic device 700 receives the connection method determination request (provision discovery request) signal including the forwarding invitation information from the second electronic device 500, the third electronic device 700 may transmit a connection method determination response (provision discovery response) signal to the second electronic device 500 for the connection with the second electronic device 500 in operation 723.

In operation 725, the second electronic device 500 may be connected to the third electronic device 700 after the remaining connection operations such as an authentication information exchange (provision) operation and a 4-way handshake operation are performed between the second electronic device 500 and the third electronic device 700. In operation 725, a connection speed may increase through omission of the authentication information exchange (provision) operation between the second electronic device 500 and the third electronic device 700 based on technology by which a WSC process can be omitted.

When the second electronic device 500 is added as a new group client, the third electronic device 700, which is the group owner, may generate a new client information descriptor including information related to the second electronic device 500. The third electronic device 700 may insert all client information descriptors of electronic devices of all group clients belonging to its own P2P group into a separate signal and transmit the signal to the electronic devices of all group clients belonging to the P2P group. Then, the first electronic device 600 belonging to the P2P group may identify a new client information descriptor including the information on the second electronic device 500 among all client information descriptors included in the signal received from the third electronic device, and may inform the user that the second electronic device 500 is connected to the third electronic device 700 through a UI.

In operation 727, the second electronic device 500 may be connected to the first electronic device 600 after being connected to the third electronic device 700 which is the owner of the P2P group.

Hereinafter, a detailed operation of each of the second electronic device 500, the first electronic device 600, and the third electronic device 700 of FIG. 7 will be described in FIGS. 8 to 11.

Figure 8:
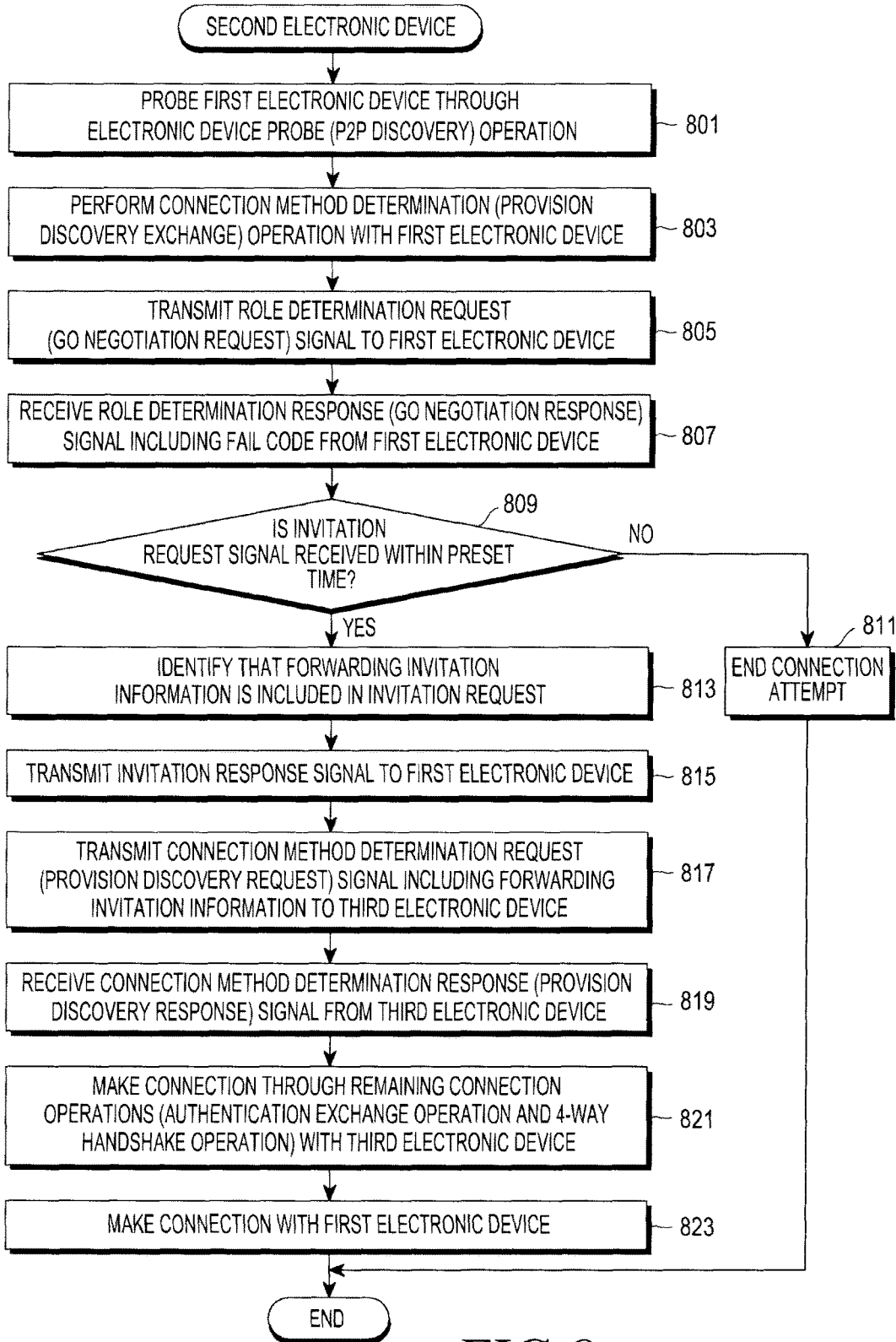
FIG. 8 is a flowchart illustrating an operation of a second electronic device, which is not connected to a group, in the system for the short-range communication connection according to the first embodiment of the present disclosure.

FIG. 8 is a flowchart illustrating the operation of the second electronic device in the system for the short-range communication connection according to the first embodiment of the present disclosure.

In FIG. 8, the operation of the second electronic device 500 of FIG. 7 which is not connected to the Group is described.

As shown, in operation 801, the second electronic device 500 may perform an operation of probing the first electronic device 600 through a discovery operation (P2P). For example, a processor (the processor 410 of FIG. 4, and hereinafter, referred to as a second processor) of the second electronic device 500 (the electronic device 401 of FIG. 4) may probe electronic devices through a discovery operation (P2P discover) and then receive a connection request from the first electronic device 600, which is a group client of the P2P group.

In operation 803, the second electronic device 500 may determine a connection method with the first electronic device 600. For example, the second processor may perform the connection method determination exchange (provision discovery exchange) operation for transmitting the connection method determination request (provision discovery request) signal to the first electronic device 600 and in response, receiving the connection method determination response (provision discovery response) signal from the first electronic device 600.

In operation 805, the second electronic device 500 may transmit the role determination request (GO negotiation request) signal to the first electronic device 600.

In operation 807, the second electronic device 500 may receive the role determination response (GO negotiation response) signal from the first electronic device 600. For example, the second electronic processor receives the role determination response (GO negotiation response) signal from the first electronic device 600 in response to the role determination request (GO negotiation request) signal, and the role determination response (GO negotiation response) signal contains a fail code as the first electronic device 600 corresponds to the group client.

In operation 809, the second electronic device 500 may determine whether to receive the invitation signal containing forwarding invitation information for inducing the connection to the group owner from the first electronic device within a predetermined period. For example, when the invitation signal including the forwarding invitation information for inducing the connection to the group owner is not received within the preset period after the role determination response (GO negotiation response) signal containing the fail code is received, the second processor may end the connection attempt with the first electronic device 600 and inform the user of the end of the connection attempt in operation 811. In another example, the second electronic device 500 may receive the invitation signal including the forwarding invitation information for inducing the connection to the group owner within the present period.

In operation 813, the second electronic device 500 may identify whether the invitation signal received from the first electronic device includes the forwarding invitation information for inducing the connection to the group owner. For example, the second processor may detect the forwarding invitation information for inducing the connection to the group owner stored in the forwarding invitation capability field of the invitation request signal. The forwarding invitation information may include flag information indicating forwarding invitation and connection accept information (whether to accept the connection and WSC information (connection method information)) controlled by the first electronic device 600. Further, the invitation request signal includes information on the first electronic device 600, which transmits the signal, and information (group ID, BSSID, channel, and the like) on the third electronic device 700 corresponding to the group owner to which the first electronic device 600 is connected.

In operation 815, the second electronic device 500 may transmit the invitation response signal to the first electronic device 600. For example, the second processor may transmit the invitation response signal to the first electronic device 600 in response to the invitation request signal. According to the reception of the invitation request signal including the forwarding invitation information, the second processor may automatically transmit the invitation response signal to the first electronic device 600. Alternatively, according to the reception of the invitation request signal including the forwarding invitation information, the second processor may inquire the user about whether to accept the connection with the third electronic device 700, which is the group owner, and when the user accepts the connection with the third electronic device 700, which is the group owner, transmit the invitation response signal to the first electronic device 600.

In operation 817, the second electronic device 500 may transmit the connection method determination request (provision discovery request) signal including the forwarding invitation information to the third electronic device 700. For example, the second processor may detect the forwarding invitation information in the forwarding invitation capability field of the invitation request signal received from the first electronic device 600 and transmit the connection method determination request (provision discovery request) signal including the detected forwarding invitation information to the third electronic device 700. The second electronic processor may transmit the connection method determination request (provision discovery request) signal to the third electronic device 700 based on information on the third electronic device 700 included in the invitation request signal.

In operation 819, the second electronic device 500 may receive the connection method determination request (provision discovery response) signal from the third electronic device 700.

In operation 821, the second electronic device may be connected to the third electronic device 700 through the performance of the remaining connection operations. For example, the second processor may be connected to the third electronic device 700 after performing the remaining connection operations such as the authentication information exchange (provision) operation and the 4-way handshake operation with the third electronic device 700.

In operation 823, the second electronic device 500 may be connected to the first electronic device 600. For example, the second processor may be connected to the first electronic device 600 after being connected to the third electronic device 700 which is the owner of the P2P group.

Figure 9A:
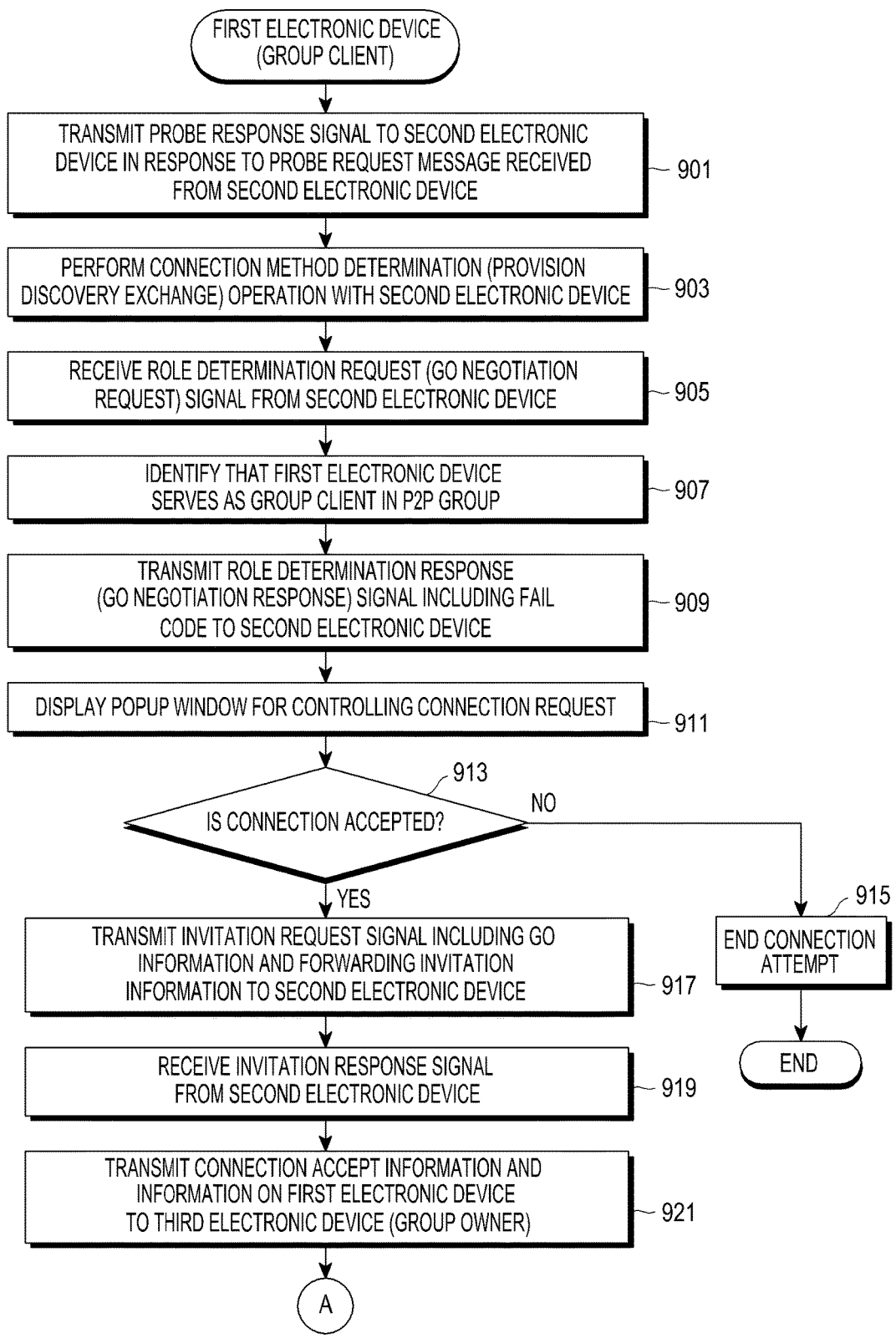
FIG. 9A and FIG. 9B are flowcharts illustrating an operation of a first electronic device, which is a group client, in the system for the short-range communication connection according to the first embodiment of the present disclosure.
Figure 9B:
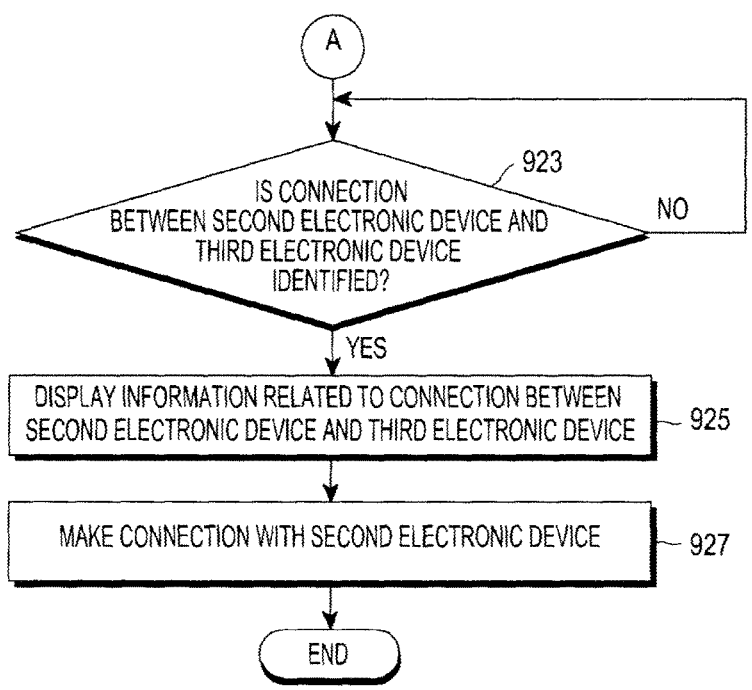

FIGS. 9A and 9B are flowcharts illustrating the operation of the first electronic device 600, which is the group client, in the system for the short-range communication connection according to the first embodiment of the present disclosure. More particularly, in FIGS. 9A and 9B, the operation of the first electronic device 600 of FIG. 7 is described.

Referring to FIGS. 9A and 9B, in operation 901, the first electronic device 600 may transmit the probe response signal to the second electronic device 500 in response to the probe request received from the second electronic device 500. For example, the processor (the processor 410 of FIG. 4, and hereinafter, referred to as the first processor) of the first electronic device 600 (the electronic device 401 of FIG. 4) may receive the probe request signal from the second electronic device 500 through the discovery operation (P2P discovery) of the electronic device with the second electronic device 500 that is not connected to the P2P group and may transmit the probe response signal to the second electronic device 500.

In operation 903, the first electronic device 600 may determine a connection method with the second electronic device 500. For example, when a connection method determination request (provision discovery request) signal corresponding to the connection request is received from the second electronic device 500, the first processor may perform a connection method determination exchange (provision discovery exchange) operation for transmitting a connection method determination response (provision discovery response) signal in response to the connection method determination request (provision discovery request) signal.

In operation 905, the first electronic device 600 may receive a role determination request signal from the second electronic device 500. For example, the first processor may receive the role determination request (GO negotiation request) signal from the second electronic device 500.

In operation 907, the first electronic device 600 may identify that the first electronic device 600 servers as the group client in the P2P group. In operation 909, the first electronic device may transmit a role determination response (GO negotiation response) signal including a fail code to the second electronic device 500.

In operation 911, the first electronic device 600 may display a popup window for controlling the connection request. For example, the first processor may inform the connection request from the second electronic device 500 and display a message that inquire about whether to accept the connection by controlling the display of the first electronic device 600.

In operation 913, the first electronic device 600 may identify whether to accept the connection from the user. For example, when the connection is not accepted by the user, the first processor may end a connection attempt with the second electronic device 500 in operation 915.

The first processor may identify whether to accept the connection from the user.

In operation 917, the first electronic device 600 may transmit an invitation request signal including group owner information and forwarding invitation information to the second electronic device 500. For example, the forwarding invitation information for inducing the connection to the group owner may be stored in a forwarding invitation capability field of the invitation request signal. The forwarding invitation information may include flag information indicating forwarding invitation and connection accept information (whether to accept the connection and WSC information (connection method information)) controlled by the first electronic device 600. The invitation request signal includes information on the first electronic device 600, which transmits the signal, and information (group ID, BSSID, channel, and the like) on the third electronic device 700 corresponding to the group owner to which the first electronic device 600 is connected. The first processor may transmit the invitation request signal including the forwarding invitation information to the second electronic device 500.

Alternatively, without operations 911 and 913, the first electronic device 600 may automatically transmit the invitation request signal to the second electronic device 500 while displaying a message that induces the connection to the third electronic device 700 corresponding to the group owner according to the connection request from the second electronic device by controlling the display of the first electronic device 600.

In operation 919, the first electronic device 600 may receive an invitation response signal from the second electronic device 500. For example, the first processor may receive the invitation response signal from the second electronic device 500 in response to the invitation request signal.

In operation 921, the first electronic 600 device may transmit connection accept information and information on the first electronic device 600 to the third electronic device 700. For example, the first processor may transmit connection accept information of the second electronic device 500 and information (for example, device address, device type, device name, and the like) on the second electronic device 500 of which the connection is accepted to the third electronic device 700 corresponding to the group owner.

In operation 923, the first electronic device 600 may identify the connection between the second electronic device 500 and the third electronic device 700. For example, the first processor may monitor whether the second electronic device 500 is connected to the third electronic device 700 corresponding to the group owner. The first processor may identify whether the second electronic device 500 is connected to the third electronic device 700 through a signal including at least one client information descriptor corresponding to electronic devices of at least one group client received from the third electronic device 700 with a periodic scan or without any periodic scan. When the signal received from the third electronic device 700 includes a new client information descriptor including information on the second electronic device 500, it may be identified that the second electronic device 500 is connected to the third electronic device 700. The first processor may identify that the second electronic device 500 is connected to the third electronic device 700.

In operation 925, the first electronic device 600 may display an operation related to the connected between the second electronic device 500 and the third electronic device 700. For example, the first processor may display information related to the connection between the second electronic device 500 and the third electronic device 700 in at least a partial area of the display of the first electronic device 600.

In operation 927, the first electronic device 600 may be connected to the second electronic device 500. For example, as the second electronic device 500 is connected to the third electronic device 700 corresponding to the group owner of the P2P group, the first processor may be connected to the second electronic device 500.

Figure 10:
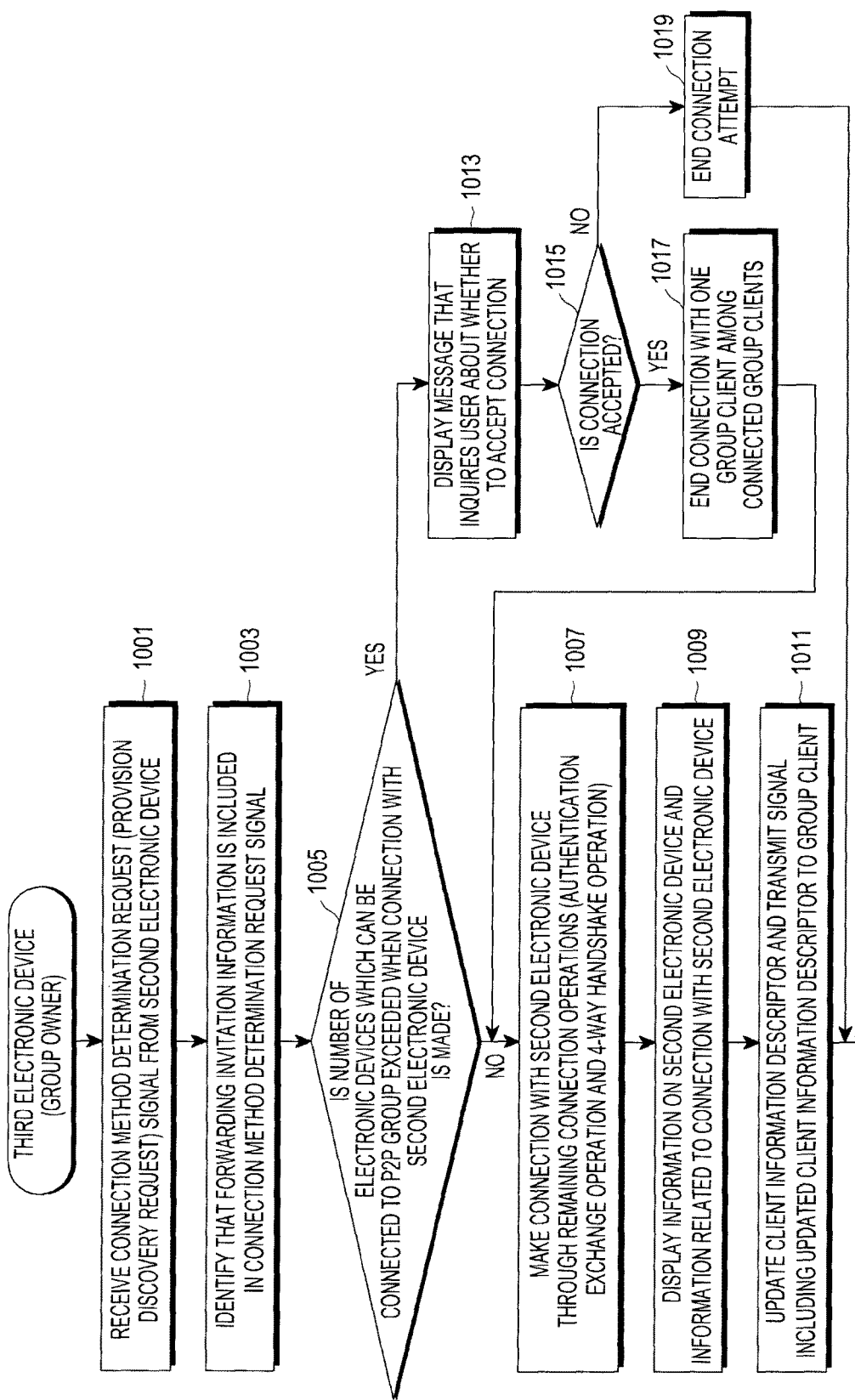
FIG. 10 is a flowchart illustrating an operation of a third electronic device, which is a group owner, in the system for the short-range communication connection according to the first embodiment of the present disclosure.

FIG. 10 is a flowchart illustrating the operation of the third electronic device corresponding to the group owner in the system for the short-range communication connection according to the first embodiment of the present disclosure. More specifically, the operation of the third electronic device 700 with reference to FIG. 7 is described.

Referring to FIG. 10, in operation 1001, the third electronic device 700 may receive a connection method determination request signal from the second electronic device 500. For example, the processor (the processor 410 of FIG. 4, and hereinafter, referred to as a third processor) of the third electronic device 700 (the electronic device 401 of FIG. 4) may receive a connection method determination request (provision discovery request) signal for a connection request from the second electronic device 500 which is not connected to the P2P group.

In operation 1003, the third electronic device 700 may identify whether forwarding invitation information is include in the connection method determination request signal. For example, the third processor may identify forwarding invitation information for inducing the connection to the group owner included in the received connection method determination request (provision discovery request) signal.

In operation 1005, when the third electronic device 700 is connected to the second electronic device 500, the third electronic device 700 may determine whether the number of electronic devices which can be connected to the P2P group is exceeded. For example, when the third electronic device 700 is connected to the second electronic device 500 which makes a request for the connection, the third processor may determine whether the number of electronic devices which can be connected to the P2P group is exceeded.

When it is determined that the number of electronic devices which can be connected to the P2P group is not exceeded in operation 1005, the third electronic device 700 may be connected to the second electronic device by performing the remaining connection operations with the second electronic device 500 in operation 1007. For example, the third processor may be connected to the second electronic device 500 after performing the remaining connection operations such as an authentication information exchange (provision) operation and a 4-way handshake operation with the second electronic device 500. In another example, even when the number of electronic devices which can be connected to the P2P group is not exceeded, the third processor may inform the user of the request for the connection from the second electronic device 500, display a message that inquire about whether to make the connection to the second electronic device 500, and perform operation 1007 when the connection is accepted by the user.

In operation 1009, the third electronic device 700 may display information about the second electronic device 500 and information related to the connection request from the second electronic device 500. For example, the third processor may display the information on the second electronic device 500 and the information related to the connection request from or to the second electronic device 500 via the display of the third electronic device 700.

In operation 1011, the third electronic device 700 may update the client information descriptor and transmit a signal including the updated client information descriptor to the group client. For example, the third processor may generate new client information descriptor that stores the information on the second electronic device 500 corresponding to the newly connected group client. The third processor may insert all client information descriptors corresponding to electronic devices of all group clients connected to the third electronic device 700, which is the group owner, into a signal (for example, a beacon signal or a probe response signal), and transmit the signal to the electronic devices of all group clients connected to the third electronic device 700.

When it is determined that the number of electronic devices which can be connected to the P2P group is exceeded in operation 1005, the third electronic device 700 may display a message that inquire the user about whether to accept the connection in operation 1013. For example, the third processor may inform that the request for the connection to the second electronic device 500 has been made and the number of connectable electronic devices is exceeded, and display a message that inquire about whether to accept the connection in at least a partial area of the display by controlling the display of the third electronic device 700.

In operation 1015, the third electronic device 700 may identify whether the user accepts the connection. When the user accepts the connection to the second electronic device 500 in operation 1015, the third electronic device 700 may end the connection with one group client among the group clients to be connected in operation 1017. For example, the third processor may display a list of the electronic devices of the group clients to be connected and end the connection with the electronic device of the group client selected by the user. In another example, the third processor may end a connection with an electronic device of a group client which has been connected for the longest time or is connected most recently among the electronic devices of the connected group clients, and inform the user of the end of the connection.

When the connection with the electronic device of one of the electronic devices of the connected group clients is ended, the third processor may perform operations 1007 to 1011.

When the user does not accept the connection with the second electronic device 500 in operation 1015, the third electronic device 700 may end the attempt of the connection with the second electronic device in operation 1019.

Figure 11:
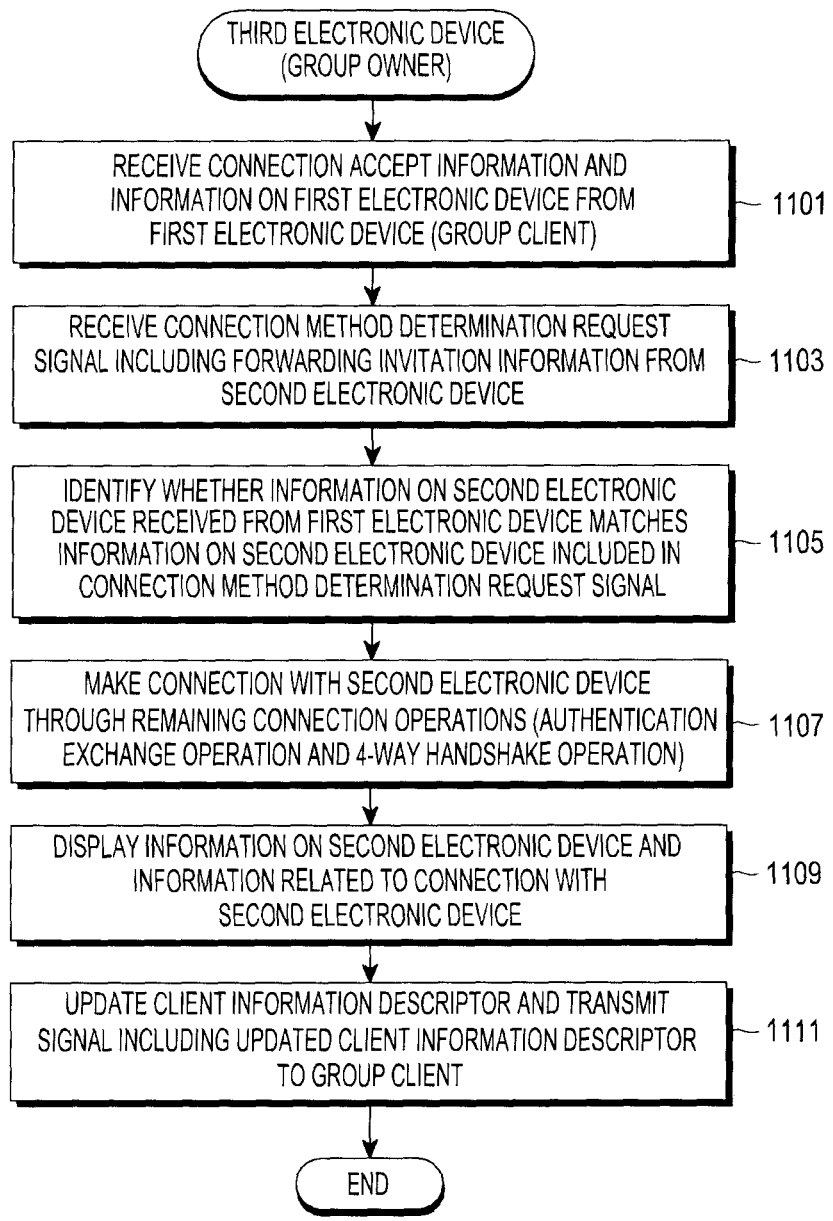
FIG. 11 is a flowchart illustrating another operation of the third electronic device, which is the group owner, in the system for the short-range communication connection according to the first embodiment of the present disclosure.

FIG. 11 is a flowchart illustrating another operation of the third electronic device corresponding to the group owner in the system for the short-range communication connection according to the first embodiment of the present disclosure.

More specifically, the operation of the third electronic device 700 with reference to FIG. 7 is described.

Referring to FIG. 11, in operation 1101, the third electronic device may receive connection accept information from the second electronic device 500 and information on the first electronic device 600. For example, the processor (the processor 410 of FIG. 4, and hereinafter, referred to as the third processor) of the third electronic device 700 (the electronic device 401 of FIG. 4) may receive connection accept information of the second electronic device, which has not been connected to the P2P group, and information (for example, a device address, a device type, a device name, and the like) on the second electronic device 500 from the first electronic device 600 corresponding to the group client.

In operation 1103, the third electronic device 700 may receive a connection method determination request signal including forwarding invitation information from the second electronic device 500.

For example, the third processor may receive the connection method determination request (provision discovery request) signal for a connection request from the second electronic device 500 and identify forwarding invitation information for inducing a connection to a group owner included in the received connection method determination request (provision discovery request) signal.

In operation 1105, the third electronic device 700 may identify whether the information on the first electronic device 600 received from the first electronic device 600 matches the information on the second electronic device 500 included in the connection method determination request signal. For example, the third processor may identify whether the information on the second electronic device 500 received from the first electronic device 600 in operation 1101 matches the information on the second electronic device 500 included in the connection method determination request (provision discovery request) signal received from the second electronic device 500 in operation 1103.

When it is identified that the pieces of information match each other, the third electronic device 700 may be connected to the second electronic device 500 by performing the remaining connection operations with the second electronic device 500 in operation 1007. For example, the third processor may be connected to the second electronic device 500 after performing the remaining connection operations such as an authentication information exchange (provision) operation and a 4-way handshake operation with the second electronic device 500. When it is identified that the pieces of information match each other, the third processor may inform the user of the connection request from the second electronic device 500 and display a message that inquire about whether to accept the connection with the second electronic device. When the connection with the second electronic device is accepted by the user, the third processor may perform operation 1107.

The third electronic device may display the information on the second electronic device 500 and information related to the connection with the second electronic device in operation 1109. For example, the third processor may display the information on the second electronic device 500 and information related to the connection with the second electronic device 500 in at least a partial area of the display by controlling the display of the third electronic device 700.

In operation 1111, the third electronic device 700 may update the client information descriptor and transmit a signal including the updated client information descriptor to the group client. For example, the third processor may generate new client information descriptor that stores the information on the second electronic device 500 corresponding to the newly connected group client. The third processor may insert all client information descriptors corresponding to electronic devices of all group clients connected to the third electronic device 700, which is the group owner, into a signal (for example, a beacon signal or a probe response signal), and transmit the signal to the electronic devices of all group clients connected to the third electronic device 700.

Figure 12:
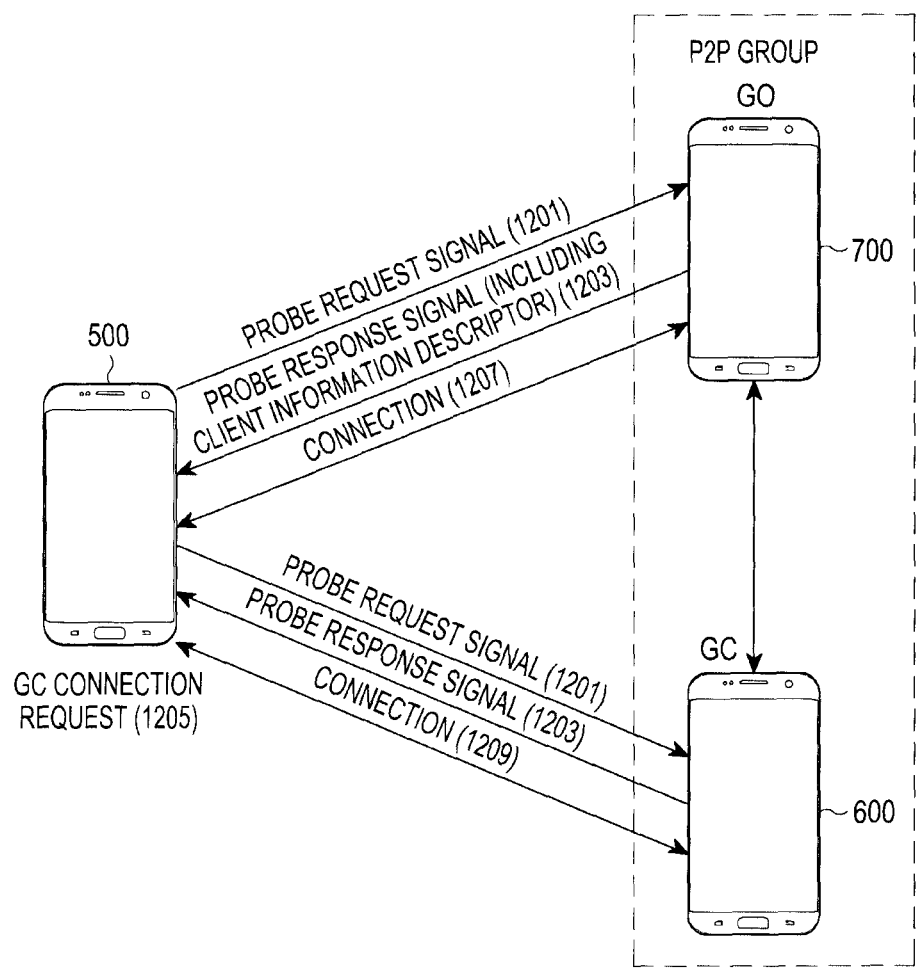
FIG. 12 illustrates the operation for the short-range communication connection in the system for the short-range communication connection according to a second embodiment of the present disclosure.

FIG. 12 illustrates the operation for the short-range communication connection in the system for the short-range communication connection according to a second embodiment of the present disclosure.

In FIG. 12, each of a second electronic device 500, a first electronic device 600, and a third electronic device 700 may include the same elements as those of the electronic device of FIG. 4.

As shown, the first electronic device 600 and the third electronic device 700 are in a state where a P2P group is formed, and the first electronic device 600 is determined as a client of the group and the third electronic device 700 is determined as an owner of the group in the P2P group.

The second electronic device 500, which has not formed the P2P group, may transmit a probe request signal in a discovery operation (P2P discovery) of the electronic device in operation 1201.

Each of the first electronic device 600 and the third electronic device 700 having received the probe request signal of the second electronic device 500 may transmit a probe response signal to the second electronic device 500 in operation 1203.

At this time, the third electronic device 700 may insert at least one client information descriptor corresponding to electronic devices of at least one group client connected to the third electronic device 700, which is the group owner, into the probe response signal as connection information, and transmit the probe response signal to the second electronic device 500 in operation 1203.

When the second electronic device 500 receives a request for the connection to the first electronic device 600 among electronic devices found by the user in operation 1205, the second electronic device 500 is connected to the third electronic device, which is the group owner, based on at least one client information descriptor included in the probe response signal received from the third electronic device 700 in operation 1207.

As the second electronic device 500 is connected to the third electronic device 700, which is the group owner, the second electronic device 500 may be connected to the first electronic device 600, which is the group client, in operation 1209.

The operation for the short-range communication described in FIG. 12 will be described in FIG. 13 in more detail.

Figure 13:
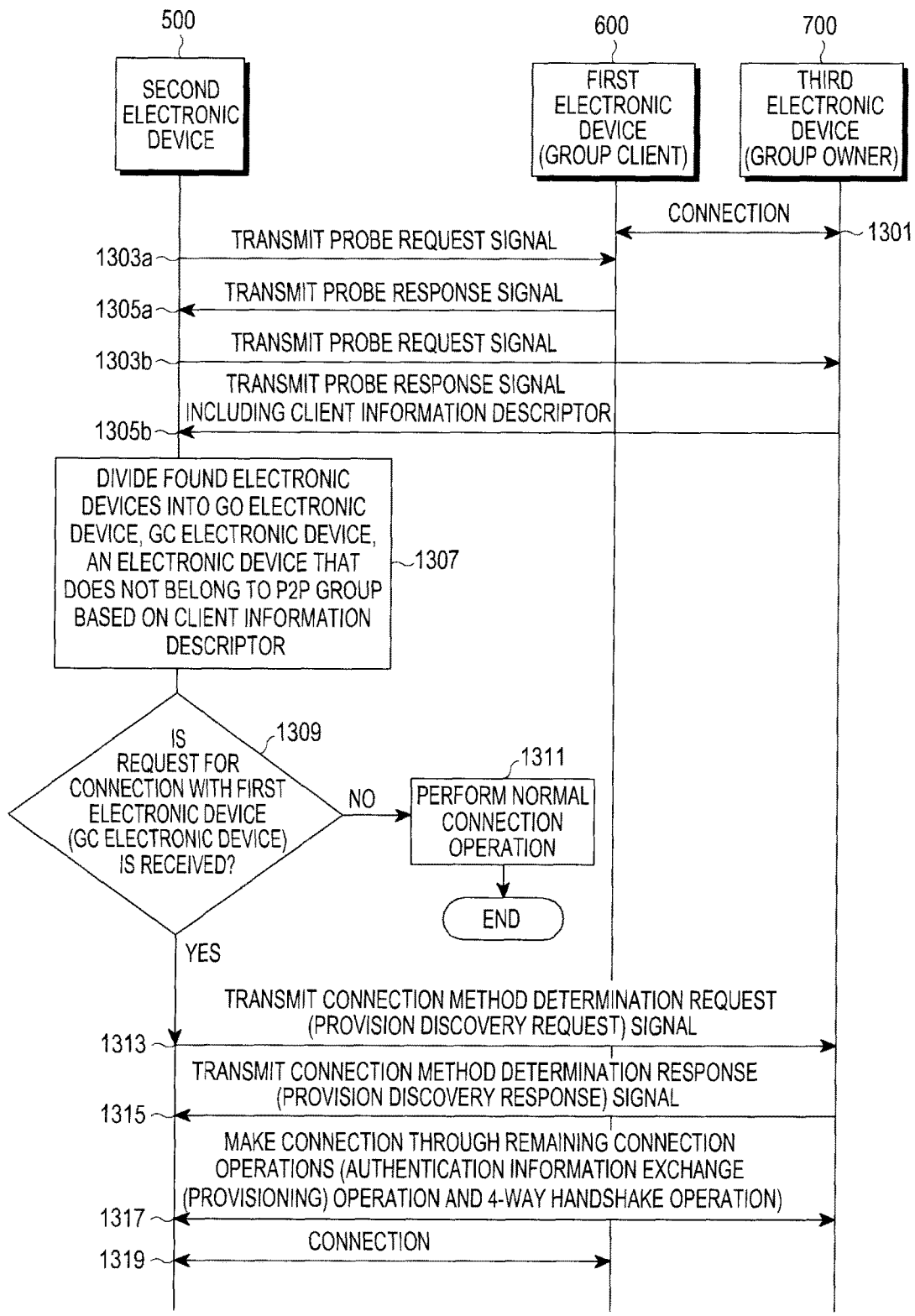
FIG. 13 illustrates in detail the operation for the short-range communication connection in the system for the short-range communication connection according to the second embodiment of the present disclosure.

FIG. 13 illustrates in detail the operation for the short-range communication connection in the system for the short-range communication connection according to the second embodiment of the present disclosure.

As shown, in operation 1301, the first electronic device 600 and the third electronic device 700 are connected to each other and form the P2P group, and the first electronic device 600 is determined to serve as the client of the group and the third electronic device 700 is determined to serve as the owner of the group in the P2P group.

In operations 1303a and 1303b, the second electronic device 500, which has not been connected to the P2P group, may transmit a probe request signal.

In operations 1305a and 1305b, each of the first electronic device 500 and the third electronic device 600 may transmit a probe response signal to the second electronic device 500 in response to the probe request signal. In operation 1305b, the third electronic device 700 may insert at least one client information descriptor corresponding to electronic devices of at least one group client connected to the third electronic device 700 into the probe response signal and transmit the probe response signal to the second electronic device 500. In operation 1307, the second electronic device 500 may detect at least one client information descriptor received from the third electronic device 700.

In operation 1307, the second electronic device 500 may classify or divide the third electronic device 700 having transmitted the probe response signal containing at least one client information descriptor among the electronic devices found in the discovery operation of the electronic device including operations 1303a to 1305b as the electronic device of the group owner. Further, the second electronic device 500 may classify or divide the electronic device corresponding to each of at least one client information descriptor among the found electronic devices as the electronic device of the group client. For example, when address information of the first electronic device 600 among the found electronic devices is included in one of at least one client information descriptor, the second electronic device 500 may divide the first electronic device 600 as the electronic device of the group client. Further, the second electronic device 500 may divide the remaining electronic devices, which have not been divided as neither the group owner nor the group client, among the found electronic devices, as the electronic devices that do not belong to the P2P group.

When a request for the connection with the third electronic device 700, which is the group owner, or the electronic device, which does not belong to the P2P group, among the electronic devices found by the user is made in operation 1309, an operation of a normal Wi-Fi Direct connection may be performed in operation 1311.

When the request for the connection with the first electronic device 600, which is the group client, among the electronic devices found by the user is made in operation 1309, the second electronic device 500 may transmit a connection method determination request (provision discovery request) signal for the connection request to the third electronic device 700 based on information on the third electronic device 700 included in the probe response signal received from the third electronic device 700 which is the group owner of the first electronic device 600 in operation 1313.

When the third electronic device 700 receives the connection method determination request (provision discovery request) signal from the second electronic device 500, the third electronic device 700 may transmit a connection method determination response (provision discovery response) signal to the second electronic device 500 for the connection with the second electronic device 500 in operation 1315.

In operation 1317, the second electronic device 500 may be connected to the third electronic device 700 after the remaining connection operations such as an authentication information exchange (provision) operation and a 4-way handshake operation are performed between the second electronic device 500 and the third electronic device 700. In operation 1317, a connection speed may increase through omission of the authentication information exchange (provision) operation between the second electronic device 500 and the third electronic device 700 based on technology by which a WSC process can be omitted.

When the second electronic device 500 is added as a new group client, the third electronic device 700, which is the group owner, may generate a new client information descriptor including information on the second electronic device 500. The third electronic device 700 may insert all client information descriptors of electronic devices of all group clients belonging to its own P2P group into a separate signal and transmit the signal to the electronic devices of all group clients belonging to the P2P group. Then, the first electronic device 600 belonging to the P2P group may identify a new client information descriptor including the information on the second electronic device 500 among all client information descriptors included in the signal received from the third electronic device, and may inform the user that the second electronic device 500 is connected to the third electronic device 700 through a UI.

In operation 1319, the second electronic device 500 may be connected to the first electronic device 600 after being connected to the third electronic device 700 which is the owner of the P2P group.

Figure 14:
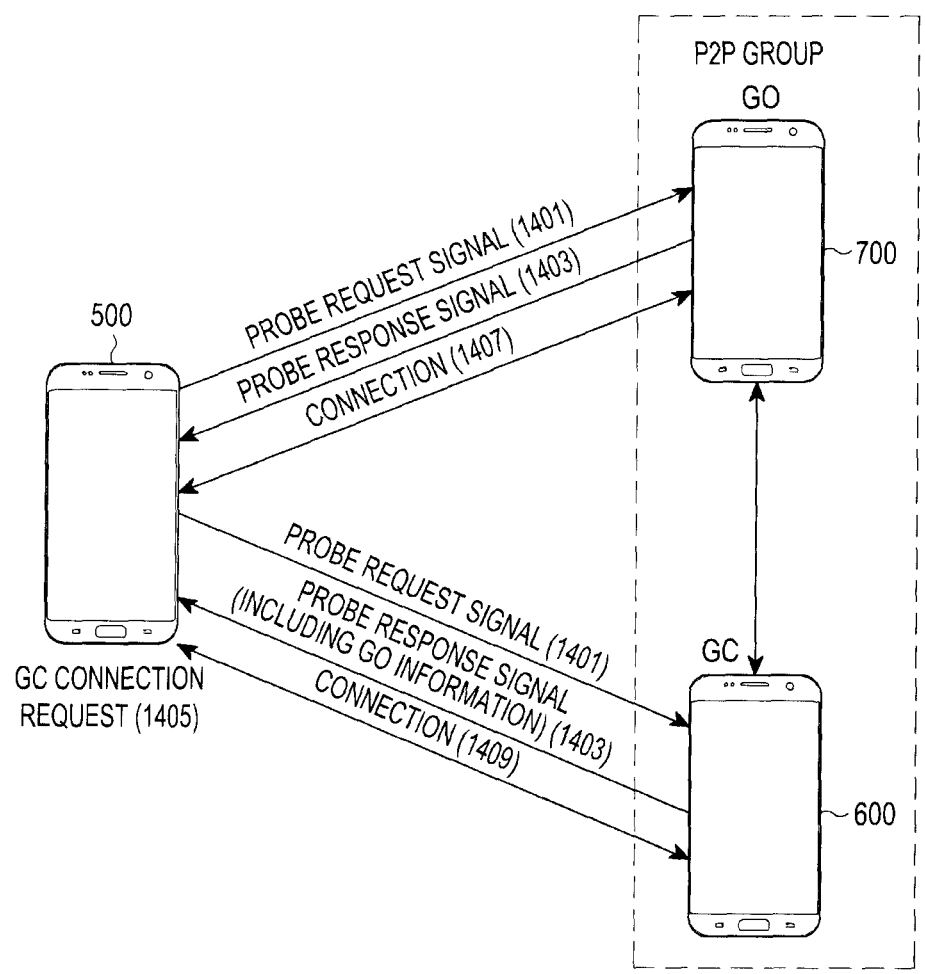
FIG. 14 illustrates another operation for the short-range communication connection in the system for the short-range communication connection according to the second embodiment of the present disclosure.

FIG. 14 illustrates another operation for the short-range communication connection in the system for the short-range communication connection according to the second embodiment of the present disclosure.

In FIG. 14, each of a second electronic device 500, a first electronic device 600, and a third electronic device 700 may include the same elements as those of the electronic device of FIG. 4.

As shown, the first electronic device 600 and the third electronic device 700 are in a state where a P2P group is formed, and the first electronic device 600 is determined as a client of the group and the third electronic device 700 is determined as an owner of the group in the P2P group.

The second electronic device 500, which has not formed the P2P group, may transmit a probe request signal in a discovery operation (P2P discovery) of the electronic device in operation 1401.

Each of the first electronic device 600 and the third electronic device 700 having received the probe request signal of the second electronic device 500 may transmit a probe response signal to the second electronic device 500 in operation 1403.

At this time, the first electronic device 600 may insert information on the third electronic device 700, which is the group owner to which the first electronic device is connected, into the prove response signal and transmit the probe response signal to the second electronic device 500 in operation 1403.

When the second electronic device 500 receives a request for the connection with the first electronic device 600 among electronic devices found by the user in operation 1405, the second electronic device 500 is connected to the third electronic device based on the information on the third electronic device included in the prove response signal received from the first electronic device in operation 1407.

As the second electronic device 500 is connected to the third electronic device 700, which is the group owner, the second electronic device 500 may be connected to the first electronic device 600, which is the group client, in operation 1409.

The operation for the short-range communication described in FIG. 14 will be described in FIG. 15 in more detail.

Figure 15:
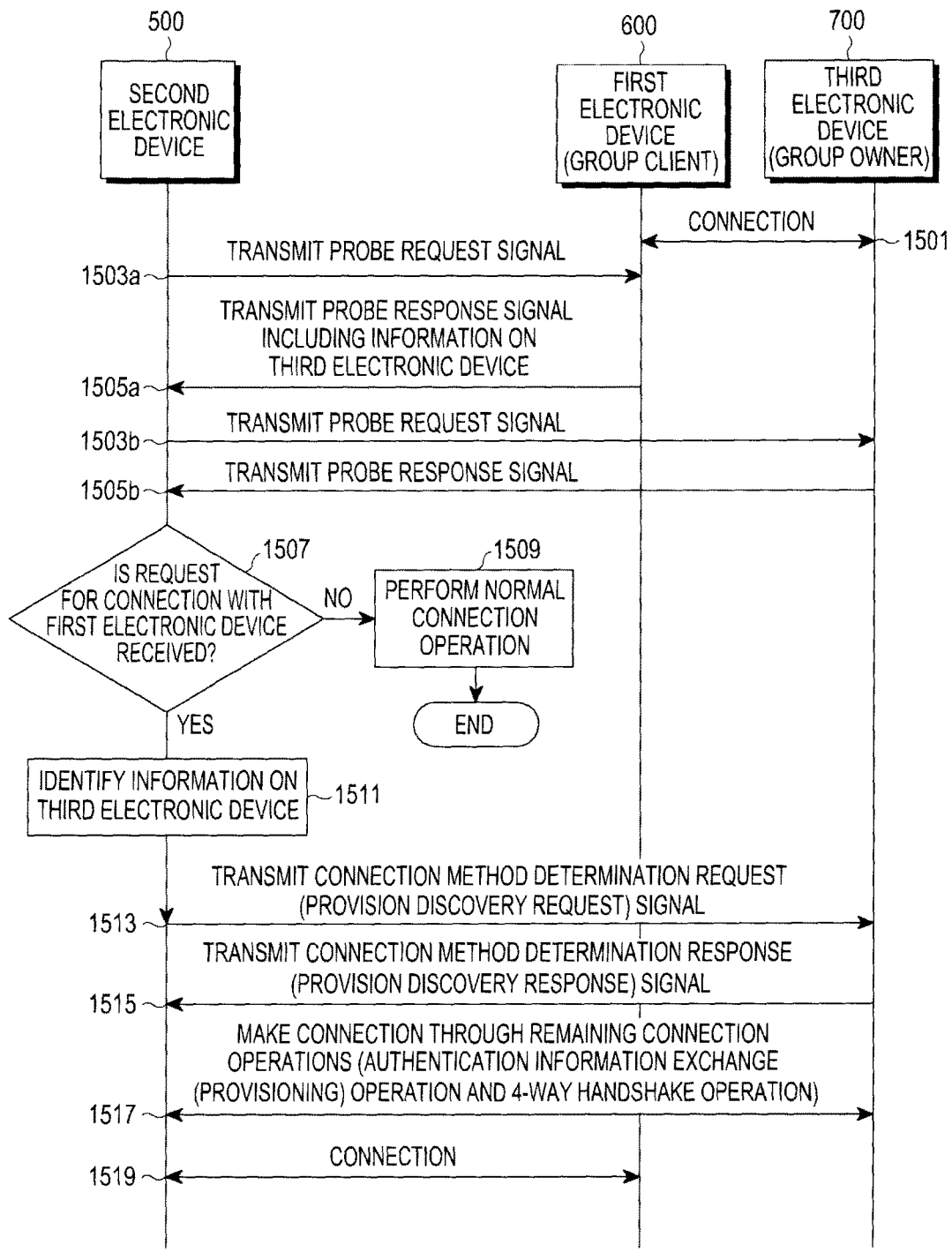
FIG. 15 illustrates in detail another operation for the short-range communication connection in the system for the short-range communication connection according to the second embodiment of the present disclosure.

FIG. 15 illustrates in detail another operation for the short-range communication connection in the system for the short-range communication connection according to the second embodiment of the present disclosure.

As shown, in operation 1501, the first electronic device 600 and the third electronic device 700 are connected to each other and form the P2P group, and the first electronic device 600 is determined to serve as the client of the group and the third electronic device 700 is determined to serve as the owner of the group in the P2P group.

In operations 1503*a* and 1503*b*, the second electronic device 500, which has not been connected to the P2P group, may transmit a probe request signal.

In operations 1505*a* and 1505*b*, each of the first electronic device 600 and the third electronic device 700 may transmit a probe response signal to the second electronic device 500 in response to the probe request signal. In operation 1505*a*, the first electronic device 600 may insert information (a group ID, a BSSID, and a channel) related the third electronic device 700, which is the group owner to which the first electronic device 600 is connected, into the probe response signal as connection information and transmit the probe response signal to the second electronic device 500.

When a request for a connection with a predetermined electronic device is made by the user among the electronic devices found by the discovery operation of the electronic device including operations 1503*a* to 1505*b* in operation 1507, the second electronic device 500 may determine whether information on the group owner connected to the second electronic device 500 is included in the probe response signal received from the electronic device having transmitted the connection request.

When the probe response signal received from the electronic device of which the connection is requested by the user does not include the information on the group owner connected to the second electronic device 500 in operation 1507, the second electronic device 500 may perform a normal operation for a Wi-Fi Direct connection in operation 1509.

When the probe response signal received from the electronic device of which the connection is requested by the user includes the information on the group owner connected to the second electronic device 500 in operation 1507, the second electronic device 500 may identify that the electronic device of which the connection is requested by the user corresponds to the first electronic device 600 which is the group client.

In operation 1511, the second electronic device 500 may identify information on the third electronic device 700, which is the group owner to which the first electronic device 600 is connected, in the probe response signal received from the first electronic device 600.

In operation 1513, the second electronic device 500 may transmit a connection method determination request (provision discovery request) signal for the connection request to the third electronic device 700 based on the information related to the third electronic device 700 included in the probe response signal received from the first electronic device.

When the third electronic device 700 receives the connection method determination request (provision discovery request) signal from the second electronic device 500, the third electronic device 700 may transmit a connection method determination response (provision discovery response) signal to the second electronic device 500 for the connection with the second electronic device 500 in operation 1515.

In operation 1517, the second electronic device 500 may be connected to the third electronic device 700 after the remaining connection operations such as an authentication information exchange (provision) operation and a 4-way handshake operation are performed between the second electronic device 500 and the third electronic device 700. In operation 1517, a connection speed may increase through omission of the authentication information exchange (provision) operation between the second electronic device 500 and the third electronic device 700 based on technology by which a WSC process can be omitted.

When the second electronic device 500 is added as a new group client, the third electronic device 700, which is the group owner, may generate a new client information descriptor including information on the second electronic device 500. The third electronic device 700 may insert all client information descriptors of electronic devices of all group clients belonging to its own P2P group into a separate signal and transmit the signal to the electronic devices of all group clients belonging to the P2P group. The first electronic device 600 belonging to the P2P group may identify a new client information descriptor including the information on the second electronic device 500 among all client information descriptors included in the signal received from the third electronic device, and may inform the user that the second electronic device 500 is connected to the third electronic device 700 through a UI.

In operation 1519, the second electronic device 500 may be connected to the first electronic device 600 after being connected to the third electronic device 700 which is the owner of the P2P group.

Having thus described different embodiments of concurrent short-range communication in a Wi-Fi P2P, it should be apparent to those skilled in the art that certain advantages of the system have been achieved including improved connection speed. The foregoing is to be constructed as only being an illustrative embodiment of this invention. Persons skilled in the art can easily conceive of alternative arrangements providing a functionality similar to this embodiment without any deviation from the fundamental principles or the scope of this invention, as explained hereinafter.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

According to one embodiment, a method of a short-range communication connection by an electronic device may include an operation of receiving a short-range communication connection request from a first electronic device and an operation of transmitting a signal including information for inducing a connection to a second electronic device, which is a group owner to which the electronic device is connected, to the other electronic device based on the short-range communication connection request received from the first electronic device.

In the embodiment, the operation of the transmitting the signal may include an operation of, when the short-range communication connection request is received from the first electronic device, displaying information related to a connection request of the other electronic device in at least a partial area of the display, and an operation of, when the connection is accepted by a user of the electronic device, transmitting the signal to the first electronic device. The signal may correspond to an invitation signal including forwarding invitation information for inducing the connection to the second electronic device and information on the electronic device of the group owner.

The method may further include an operation of transmitting a signal including at least one piece of information on the first electronic device and connection accept information of the first electronic device to the second electronic device.

The method may further include an operation of monitoring whether the first electronic device is connected to the second electronic device and an operation of, when the connection between the first electronic device and the second electronic device is identified based on a result of the monitoring, displaying information related to the connection between the first electronic device and the second electronic device. The operation of monitoring the connection may include an operation of identifying the connection between the first electronic device and the second electronic device based on reception of a signal including information on an electronic device of at least one group client connected to the second electronic device from the second electronic device.

According another embodiment, a method of a short-range communication connection may include an operation of, when a first electronic device receives a signal including information for inducing a connection to a third electronic device, which is a group owner to which a second electronic device is connected, from the second electronic device in response to a short-range communication connection request, making a request for the connection to the third electronic device, an operation of, when the second electronic device, which is a group client, receives the short-range communication connection request from the first electronic device, transmitting the signal including information for inducing the connection to the third electronic device to the first electronic device, and an operation of, when the third electronic device, which is the group owner, receives the signal including the information for inducing the connection to the third electronic device, connecting short-range communication with the first electronic device.

In the embodiment, the method may further include an operation of, ending the connection with the second electronic device when the first electronic device does not receive the signal including the information for inducing the connection to the third electronic device within a preset time after receiving a role determination response (GO negotiation response) signal including a fail code from the second electronic device. The signal, which the first electronic device receives from the second electronic device, may correspond to an invitation signal including forwarding invitation information for inducing the connection to the third electronic device and information on the third electronic device.

In the embodiment, the operation of transmitting the invitation signal to the first electronic device by the second electronic device may include an operation of, when the short-range communication connection request is received from the first electronic device, displaying information related to the connection request of the first electronic device in at least a partial area of a display, and an operation of when the connection is accepted by a user of the second electronic device, transmitting the signal to the first electronic device. The signal transmitted to the first electronic device may correspond to an invitation signal including forwarding invitation information for inducing the connection to the third electronic device and information on the third electronic device.

The method may further include an operation of transmitting a signal including at least one piece of information on the first electronic device and connection accept information of the first electronic device to the third electronic device by the second electronic device, and an operation of monitoring whether the first electronic device is connected to the third electronic device, and when the connection between the first electronic device and the third electronic device is identified based on a result of the monitoring, displaying information related to the connection between the first electronic device and the third electronic device by the second electronic device.

In the embodiment, the second electronic device may identify the connection between the first electronic device and the third electronic device through reception of a signal including information on an electronic device of at least one group client connected to the third electronic device from the third electronic device. The signal, which the third electronic device receives from the first electronic device, may correspond to a connection method determination request (provision discovery request) signal including forwarding invitation information for inducing the connection to the third electronic device and information on the first electronic device.

The method may further include an operation of, when the number of group clients exceeds the number of group clients, which can be connected to the third electronic device in the connection with the first electronic device, displaying information related to the excess of the number of connections to a user of the third electronic device by the third electronic device, and an operation of, when the connection with the first electronic device is accepted by the user of the third electronic device, ending a connection with a predetermined electronic device among electronic devices of at least one group client connected to the third electronic device by the third electronic device.

The method may further include an operation of, when the third electronic device is connected to the first electronic device through short-range communication, updating information on an electronic device of at least one group client connected to the third electronic device and transmitting the updated information to the electronic device of the at least one group client.

According another embodiment, a method of a short-range communication connection by an electronic device may include an operation of receiving connection information indicating a connection with a first electronic device, which is a group owner, from at least one of electronic devices found by a search for an electronic device for a short-range communication connection, and an operation of, when a request for a connection to a second electronic device, which is a group client among the found electronic devices, is made, making a request for the short-range communication connection to the second electronic device, to which the second electronic device is connected, based on the connection information.

The method may further include an operation of, when the connection information including information on at least one second electronic device is received from the first electronic device among the found electronic devices, detecting at least one electronic device corresponding to the information on the at least one second electronic device included in the connection information among the found electronic devices as the second electronic device.

The method may further include an operation of receiving the connection information including information on the first electronic device, which is the group owner, from at least one second electronic device among the found electronic devices.

According to another embodiment, a storage medium storing instructions may be provided. The instructions may be configured to cause at least one processor to perform at least one operation when being executed by the at least one processor. The at least one operation may record programs for executing an operation of receiving a short-range communication connection request from a first electronic device and an operation of transmitting a signal including information for inducing a connection to a second electronic device, which is a group owner to which the electronic device is connected, to the other electronic device based on the short-range communication connection request received from the first electronic device.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from the central scope. Therefore, it is intended that the present invention not be limited to the particular embodiment disclosed as the best mode contemplated for carrying out the present invention, but that the present invention include all embodiments falling within the scope of the appended claims.

What is claimed is:

1. An electronic device comprising:
   a display;
   a communication circuit;
   a processor operably coupled to the display and the communication circuit; and
   a memory operably coupled to the processor,
   wherein the memory stores instructions that, when executed by the processor, cause the processor to:
     establish a group communication connection with an external device, wherein the electronic device is a group client in the group communication connection, and the external device is a group owner in the group communication connection,
     receive a short-range communication connection request from a first electronic device through the communication circuit, and
     transmit, to the first electronic device, a first message including information for inducing the first electronic device to transmit a second message for attending the group communication connection to the external device.

2. The electronic device of claim 1, wherein the instructions cause the processor to:
   display first information related to the short-range communication connection request in at least a partial area of the display based on the received short-range communication connection request, and
   when the short-range communication connection request is accepted by a user of the electronic device, transmit the first message to the first electronic device.

3. The electronic device of claim 1, wherein the first message corresponds to an invitation signal including forwarding invitation information for inducing the first electronic device to connect to the external device and first information related to the external device.

4. The electronic device of claim 1, wherein the instructions cause the processor to:
   transmit, to the external device, a third message including at least one piece of first information related to the first electronic device and connection accept information related to the first electronic device.

5. The electronic device of claim 1, wherein the instructions cause the processor to:
   identify whether the first electronic device is connected to the external device, and
   in response to identifying the first electronic device being connected to the external device, display first information related to a short-range communication connection between the first electronic device and the external device in at least a partial area of the display.

6. The electronic device of claim 5, wherein the instructions cause the processor to:
   identify the short-range communication connection between the first electronic device and the external device based on receiving, from the external device, a third message including second information related to a particular electronic device of at least one group client connected to the external device.

7. The electronic device of claim 6, wherein the instructions cause the processor to:
   when the short-range communication between the first electronic device and the external device is established, receive a fourth message including third information related to at least one electronic device defined as a group client from the external device.

8. The electronic device of claim 1, wherein the first message includes first information associated with the external device for the first electronic device to transmit the second message by using the first information associated with the external device.

9. A method of a short-range communication connection by an electronic device, the method comprising:
   establishing a group communication connection with an external device, wherein the electronic device is a group client in the group communication connection, and the external device is a group owner in the group communication connection;
   receiving a short-range communication connection request from a first electronic device; and
   in response to the received short-range communication connection request, transmitting, to the first electronic device, a first message including information for inducing the first electronic device to transmit a second message for attending the group communication connection to the external device.

10. The method of claim 9, wherein the transmitting of the first message comprises:
    based on the short-range communication connection request being received from the first electronic device, displaying first information related to the short-range communication connection request from the first electronic device in at least a partial area of a display; and
    based on the short-range communication connection being accepted by a user of the electronic device, transmitting the first message to the first electronic device.

11. The method of claim 9, wherein the first message corresponds to an invitation signal including forwarding invitation information for inducing the first electronic device to connect to the external device and first information related to the external device.

12. The method of claim 9, further comprising transmitting, to the external device, a third message including at least one piece of first information related to the first electronic device and connection accept information of the first electronic device.

13. The method of claim 9, further comprising:
identifying whether the first electronic device is connected to the external device; and
in response to identifying the first electronic device being connected to the external device, displaying, on a display, first information related to the short-range communication connection between the first electronic device and the external device.

14. The method of claim 13, further comprising:
identifying the short-range communication connection between the first electronic device and the external device based on receiving, from the external device, a third message including second information related to a particular electronic device of at least one group client connected to the external device.

15. The method of claim 14, further comprising:
when the short-range communication connection between the first electronic device and the external device is established, receiving a fourth message including third information related to at least one electronic device defined as a group client from the external device.

16. The method of claim 9, wherein the first message includes first information associated with the external device for the first electronic device to transmit the second message by using the first information associated with the external device.

* * * * *